US012277735B2

(12) United States Patent
Hunsmann et al.

(10) Patent No.: US 12,277,735 B2
(45) Date of Patent: Apr. 15, 2025

(54) STYLE PROFILE ENGINE

(71) Applicant: StyleRiser Inc., Bakersfield, CA (US)

(72) Inventors: Margrit Sieglinde Hunsmann, Schwäbisch Gmünd (DE); Mark Hunsmann, Schwäbisch Gmünd (DE); Glen Kenneth Brown, Bakersfield, CA (US)

(73) Assignee: StyleRiser Inc., Bakersfield, CA (US)

( * ) Notice: Subject to any disclaimer, the term of this patent is extended or adjusted under 35 U.S.C. 154(b) by 369 days.

(21) Appl. No.: 18/045,424

(22) Filed: Oct. 10, 2022

(65) Prior Publication Data

US 2023/0129243 A1 Apr. 27, 2023

Related U.S. Application Data

(63) Continuation-in-part of application No. 17/208,939, filed on Mar. 22, 2021, now Pat. No. 11,727,600, which is a continuation of application No. 16/628,620, filed as application No. PCT/US2018/040631 on Jul. 2, 2018, now Pat. No. 10,984,559.

(60) Provisional application No. 62/528,274, filed on Jul. 3, 2017.

(51) Int. Cl.
*G06T 7/90* (2017.01)
*G06Q 30/0601* (2023.01)
*G06V 40/16* (2022.01)

(52) U.S. Cl.
CPC ............ *G06T 7/90* (2017.01); *G06Q 30/0623* (2013.01); *G06V 40/168* (2022.01); *G06T 2207/10024* (2013.01); *G06T 2207/30201* (2013.01)

(58) Field of Classification Search
CPC ............ G06T 7/90; G06T 2207/10024; G06T 2207/30201; G06Q 30/0623; G06Q 30/0621; G06V 40/168; G01J 2003/466; G01J 2003/467; G01J 3/463; G01J 3/50
USPC ....................................................... 382/100
See application file for complete search history.

(56) References Cited

U.S. PATENT DOCUMENTS

| 7,765,225 | B2 | 7/2010 | Robert |
| 8,860,748 | B2 | 10/2014 | Campbell et al. |
| 9,064,279 | B1 | 6/2015 | Tuan et al. |
| 9,671,795 | B2 | 6/2017 | Igarashi |

(Continued)

FOREIGN PATENT DOCUMENTS

| WO | WO-2016183629 A1 | 11/2016 |
| WO | WO-2019010134 A1 | 1/2019 |

OTHER PUBLICATIONS

"U.S. Appl. No. 17/208,939, Response filed Feb. 28, 2023 to Non Final Office Action mailed Sep. 28, 2022", 9 pgs.

(Continued)

*Primary Examiner* — Ali Bayat
(74) *Attorney, Agent, or Firm* — Schwegman Lundberg & Woessner, P.A.

(57) ABSTRACT

Various embodiments described herein provide techniques for analyzing an image (e.g., a selfie) of a user with one or more pre-trained machine learned models, to detect facial characteristics of the user. Then, using the output of the machine learned model(s), various combinations of detected facial characteristics are used to assign the user with one style profile of several predefined style profiles. Finally, the style profile may be used in the selection of one or more products to be recommended to the user.

24 Claims, 23 Drawing Sheets

(56) References Cited

U.S. PATENT DOCUMENTS

| | | |
|---|---|---|
| 10,984,559 B2 | 4/2021 | Hunsmann et al. |
| 2003/0065552 A1 | 4/2003 | Rubinstenn et al. |
| 2003/0133599 A1* | 7/2003 | Tian ............... G06V 40/175 |
| | | 382/118 |
| 2005/0111729 A1 | 5/2005 | Caisey |
| 2005/0264658 A1 | 12/2005 | Ray et al. |
| 2007/0076013 A1 | 4/2007 | Campbell et al. |
| 2008/0052312 A1* | 2/2008 | Tang ............... G06F 16/583 |
| | | 707/E17.02 |
| 2008/0313147 A1 | 12/2008 | Svore et al. |
| 2011/0016001 A1 | 1/2011 | Schieffelin |
| 2011/0082764 A1 | 4/2011 | Bruck et al. |
| 2014/0100863 A1 | 4/2014 | Mantz |
| 2014/0148706 A1* | 5/2014 | Van Treeck ............ F24F 11/64 |
| | | 600/474 |
| 2014/0195506 A1 | 7/2014 | Perlegos |
| 2015/0055086 A1 | 2/2015 | Fonte et al. |
| 2015/0088921 A1 | 3/2015 | Somaiya et al. |
| 2015/0125049 A1* | 5/2015 | Taigman ............ G06V 40/168 |
| | | 382/118 |
| 2016/0335693 A1 | 11/2016 | Lin et al. |
| 2017/0039281 A1 | 2/2017 | Venkata et al. |
| 2017/0077764 A1 | 3/2017 | Bell et al. |
| 2017/0091529 A1* | 3/2017 | Beeler ............... G06T 7/246 |
| 2017/0118308 A1 | 4/2017 | Vigeant et al. |
| 2017/0154208 A1* | 6/2017 | Zhang ............... G06V 40/161 |
| 2018/0189853 A1 | 7/2018 | Stewart et al. |
| 2018/0260871 A1 | 9/2018 | Harvill et al. |
| 2018/0307727 A1 | 10/2018 | Lucas et al. |
| 2019/0014884 A1 | 1/2019 | Fu et al. |
| 2019/0125249 A1 | 5/2019 | Rattner et al. |
| 2019/0205950 A1 | 7/2019 | Balasubramanian et al. |
| 2019/0318505 A1 | 10/2019 | Lasalle et al. |
| 2020/0104415 A1 | 4/2020 | Satti et al. |
| 2020/0117658 A1 | 4/2020 | Venkata et al. |
| 2020/0160563 A1 | 5/2020 | Hunsmann et al. |
| 2020/0175076 A1 | 6/2020 | Powers et al. |
| 2020/0349634 A1 | 11/2020 | Ghamsari et al. |
| 2021/0004379 A1 | 1/2021 | Lee et al. |
| 2021/0182350 A1 | 6/2021 | Gottumukkala et al. |
| 2021/0191925 A1 | 6/2021 | Sianez |
| 2021/0271823 A1 | 9/2021 | De Ridder |
| 2021/0279911 A1 | 9/2021 | Hunsmann et al. |
| 2022/0100746 A1 | 3/2022 | Chen et al. |
| 2022/0293102 A1 | 9/2022 | Lee et al. |
| 2023/0004601 A1 | 1/2023 | Rajan et al. |
| 2023/0245651 A1 | 8/2023 | Wang |
| 2024/0020538 A1 | 1/2024 | Socher et al. |
| 2024/0031367 A1 | 1/2024 | Pringle |
| 2024/0202202 A1 | 6/2024 | Yudin et al. |
| 2024/0256618 A1 | 8/2024 | Adada et al. |
| 2024/0256622 A1 | 8/2024 | Abrams et al. |
| 2024/0281472 A1 | 8/2024 | Larhette et al. |
| 2024/0281487 A1 | 8/2024 | Bathwal et al. |

OTHER PUBLICATIONS

"U.S. Appl. No. 17/208,939, Notice of Allowance mailed Mar. 22, 2023", 9 pgs.

"All Eyes on Hue", [online]. Retrieved from the Internet: <URL: https://apps.apple.com/us/app/all-eyes-on-hue-portable-personalized-seasonal-color/id939633468>.

"U.S. Appl. No. 16/628,620, Examiner Interview Summary mailed Mar. 2, 2021", 2 pgs.

"U.S. Appl. No. 16/628,620, Non Final Office Action mailed Feb. 24, 2021", 14 pgs.

"U.S. Appl. No. 16/628,620, Notice of Allowance mailed Mar. 9, 2021", 12 pgs.

"U.S. Appl. No. 17/208,939, Non Final Office Action mailed Sep. 28, 2022", 14 pgs.

"U.S. Appl. No. 17/208,939, Supplemental Preliminary Amendment filed Jun. 1, 2021", 9 pages.

"International Application Serial No. PCT/US2018/040631, International Preliminary Report on Patentability mailed Jan. 16, 2020", 9 pgs.

"International Application Serial No. PCT/US2018/040631, International Search Report mailed Sep. 17, 2018", 2 pgs.

"International Application Serial No. PCT/US2018/040631, Written Opinion mailed Sep. 17, 2018", 7 pgs.

U.S. Appl. No. 18/443,838, filed Feb. 16, 2024, Enhanced Search Result Generation Using Multi-Document Summarization.

U.S. Appl. No. 18/443,903, filed Feb. 16, 2024, Interactive Interface With Generative Artificial Intelligence.

"U.S. Appl. No. 18/443,838, Non Final Office Action mailed Sep. 28, 2024", 14 pages.

"U.S. Appl. No. 18/443,903, Non Final Office Action mailed Oct. 25, 2024", 14 pages.

* cited by examiner

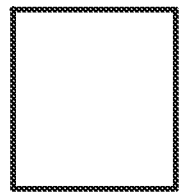 ——————— RECTANGULAR
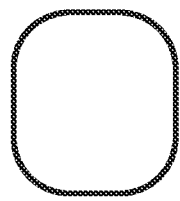 ——————— ROUNDED RECTANGULAR
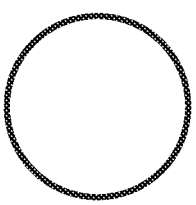 ——————— CIRCULAR
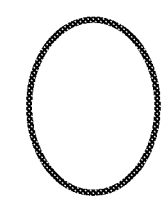 ——————— OVALOID
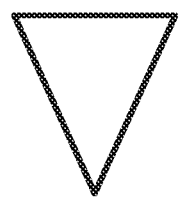 ——————— INVERTED TRIANGULAR
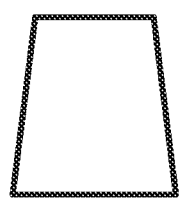 ——————— TRAPEZOIDAL
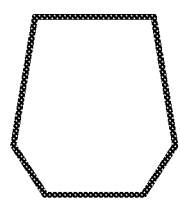 ——————— KITE
*Fig. 20*

Fig. 21

| FACIAL CHARACTERISTIC #1 | + | FACIAL CHARACTERISTIC #2 | + | FACIAL CHARACTERISTIC #3 | = | STYLE PROFILE |
|---|---|---|---|---|---|---|
| VALUE#1 | | VALUE#4 | | VALUE#1 | | VALUE#1 |
| VALUE#2 | | VALUE#3 | | VALUE#7 | | VALUE#2 |
| VALUE#3 | | VALUE#1 | | VALUE#6 | | VALUE#3 |
| VALUE#4 | | VALUE#2 OR VALUE#5 | | VALUE#2 | | VALUE#4 |
| VALUE#5 | | VALUE#10 | | VALUE#4 | | VALUE#5 |
| VALUE#6 | | VALUE#9 | | VALUE#3 | | VALUE#6 |
| VALUE#7 | | VALUE#8 | | VALUE#3 OR VALUE#5 | | VALUE#7 |

EXAMPLE:
(FACE SHAPE = ROUND) + (EYE BROW LINES = MEDIUM CURVED) + (LIPS SIZE = MEDIUM) → (STYLE#5 + NATURAL)

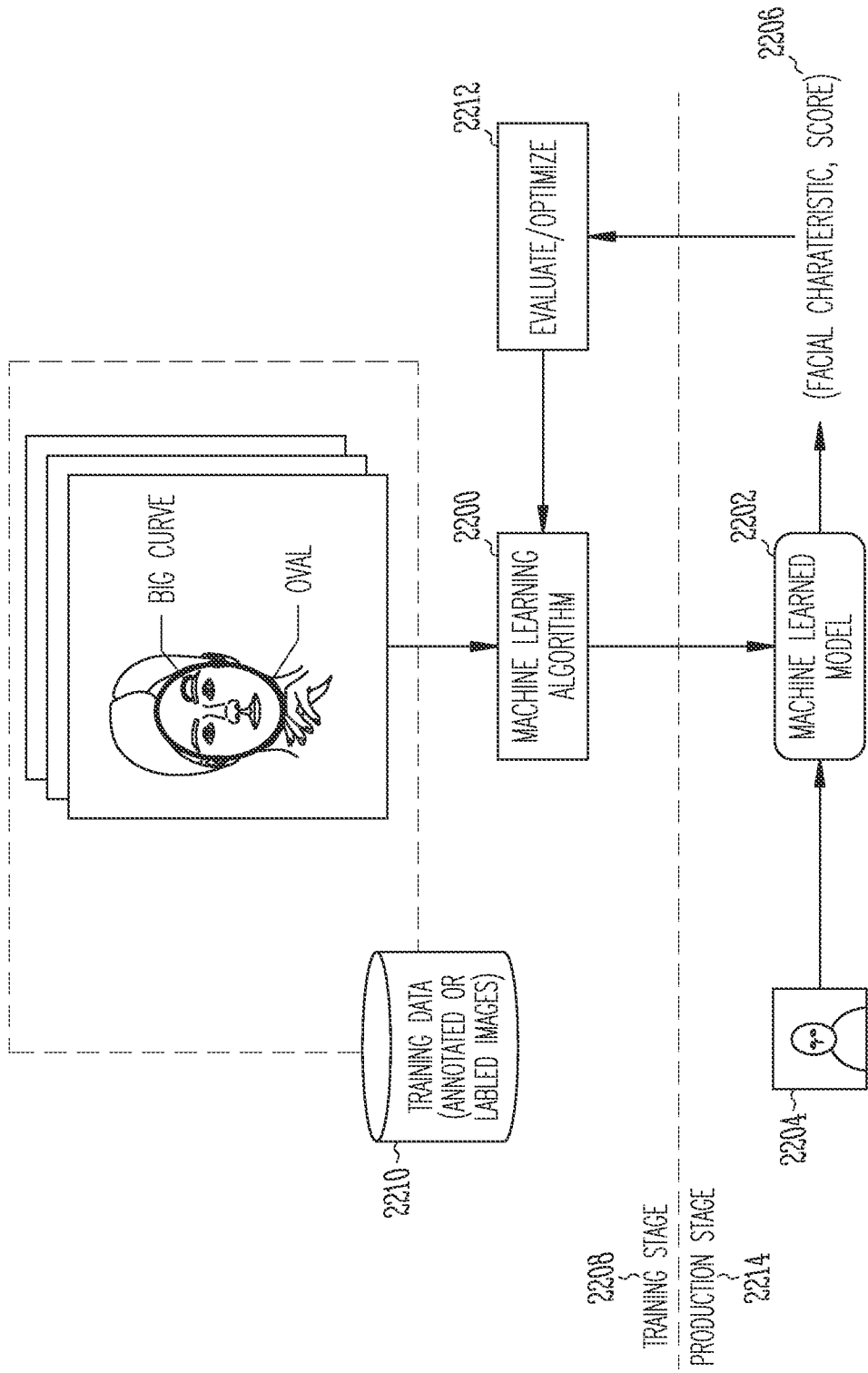

STYLE PROFILE ENGINE

CLAIM FOR PRIORITY

This application is a continuation-in-part of U.S. patent application Ser. No. 17/208,939 ("the '939 application"), filed on Mar. 22, 2021, which is incorporated herein by reference in its entirety. The '939 application is a continuation of U.S. patent application Ser. No. 16/628,620, filed on Jan. 3, 2020, which claims the benefit of priority of U.S. Provisional Application Ser. No. 62/528,274, filed on Jul. 3, 2017, both of which are hereby incorporated herein, by reference, in their entireties.

BACKGROUND

In the past, matching or selecting clothing and accessories based on a person's biological characteristics (e.g., color, size, shape, facial characteristics, etc.) has been handled through a personal consultation. This process can typically involve draping many colored fabrics over the shoulder of the person being analyzed. These colors are staged in a specific order and for a specific outcome. There has been some work to digitize this process, however the current efforts are very simplistic and do not provide accurate or complete results.

A manual process delivered by a highly trained and experienced color analyst or image consultant, who may hand out a physical color palette to be used for the manual/brick-and-mortar shopping experience, is not scalable and cannot practically be applied in the context of online shopping via e-commerce websites.

There are a number of mobile or online applications targeted at analyzing user's facial complexion based on a selfie image. All of them are connected to the online purchase of cosmetics (one example is an app called 'Plum Perfect'). Those apps attempt to capture tones from certain facial features, but are designed to draw conclusions that are relevant for the cosmetic industry.

AllEyesOnHue is one example product attempting to provide a color analysis approach based on a selfie upload, but is targeted toward assisting a manual/brick-and-mortar shopping experience. U.S. Pat. No. 8,860,748 describes another facial color analysis process.

BRIEF SUMMARY

A system is disclosed that analyzes a digital image of a person's face (e.g., from a selfie) for color and facial features or characteristics to derive a set of colors and patterns that complement and enhance the person's look when applied to clothing products worn by the person. In addition, the system may utilize a combination of various facial characteristics to assign to a user one or more of a variety of style profiles, which can then be used in the selection and recommendation of various products.

The system improves the online shopping experience by analyzing the color content of a user-provided selfie (self image), and by analyzing a user's facial characteristics to determine a style profile for the user. A product display more appealing to the user is thus presented, increasing the likelihood of a purchase.

The system uses software-based color analysis, and facial feature analysis, to assist with identifying suitable apparel online. Along with the provided color intelligence, the system may leverage other facial characteristics to determine gender, age, and other demographic attributes, directly from the provided selfie image. The system reduces the chances of mis-purchases or unsuitable apparel selections being presented to the end-user. It also reduces the high cost of returns and significantly increases user satisfaction. The system may encourage users to make purchases of products beyond those including a limited set of colors and characteristics that the user perceives as 'safe'.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 20 illustrates an example of the many shapes that an automated machine learned model may identify and which may be used to assign a user to one of a number of different style profiles.

FIG. 21 shows examples of how a combination of facial characteristics—for example, shape, lines, sizes and proportions, and so forth—may be combined to form a style profile for a user, consistent with some embodiments.

FIG. 22 illustrates an example of a system that operates on inputs—a selfie and survey answers—to generate a digital representation of a user's style profile, consistent with some embodiments as described herein.

DETAILED DESCRIPTION

The disclosed system analyzes facial features from a settle (e.g., a photo) in order to determine a user's color signature (best matching colors) and facial characteristics (user styles) for use in selecting products like garments, accessories and/or cosmetics.

The preferred mode operates a color analysis engine from an e-commerce website to select clothing colors and enhance the shopping experience and customer satisfaction. An application programming interface (API) for the color engine and style engine may be made available to e-commerce sites to integrate into and use their existing customer profiles and enhance their customer's shopping experience. This color information output by the color engine, and the style profile generated by the style engine, may be applied to the design of new clothing that better fits a site's customer base.

The digital color analysis engine has to overcome technical problems such as,
- Different smart phone cameras resulting in different picture qualities
- Selfies taken with widely varying light conditions
- Prioritizing various facial spaces or elements
- Capturing the correct color data from selfies
- Dealing with features such as tanning and dyed hair
- Detecting correct color types for users with complex/complicated complexions Once color information is obtained from a selfie, a matching engine has to overcome technical problems such as,
- Rendering retailers' products with matching color content
- Matching users' style profile information with retailers' product (color) information
- Rapid display of product representation in correct color, gender, and style.

Figure 1:
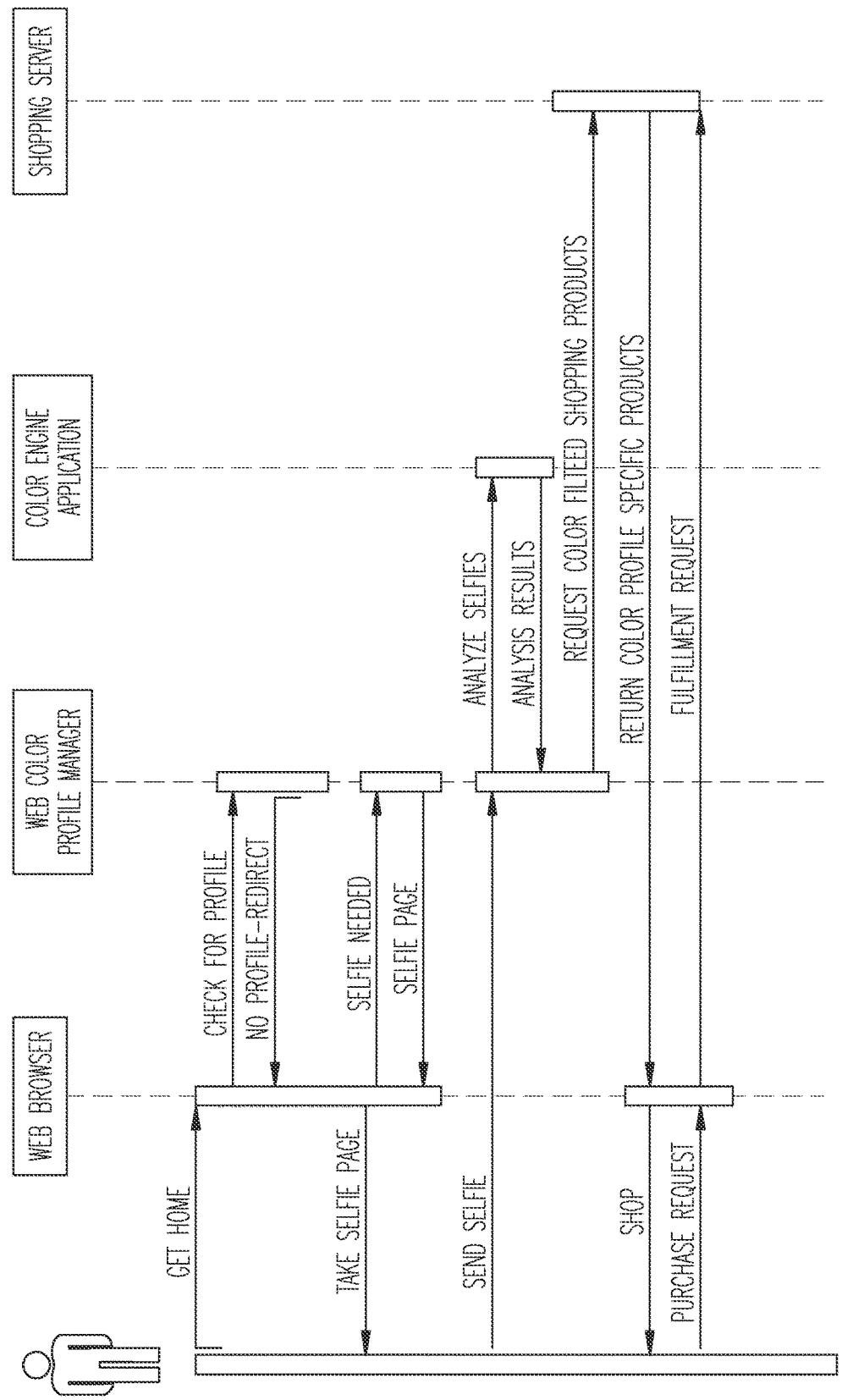
FIG. 1 illustrates an embodiment of a purchase fulfillment process 100 in which a user profile does not exist, or does not include a self-image of the user.

FIG. 1 illustrates an embodiment of a purchase fulfillment process 100. A user of a web service operates a web browser to a home page of the service (e.g., web color profile manager). The service checks for a user profile including a self-image of the user. If no self-image is located, the browser is directed to a web page that prompts the user to take and upload a self-image (i.e., selfie).

The color engine needs a selfie to build a color profile. In some embodiments the system can operate purely from the selfie, and no other personal information is collected or needed. In such "stateless" systems, the color palette generated for the user remains in effect during the user's web session, and is not saved beyond the session. No user profile creation is necessary in this use model (except for information extracted from the selfie for the session). With some embodiments, the style engine also operates in this manner.

The user may optionally create a user account (e.g., a StyleID) at the web service (e.g., as one provided by StyleRiser Inc.) and save the color palette information. The web service may send a web cookie including the color palette information to the user's computer to be stored by the user's web browser while the user is browsing. The web cookie can then be accessed by e-commerce websites to access the color palette information, and a style profile of the user. This would allow the user to shop in the future at any e-commerce websites that have access to the web cookie without submitting a new selfie. The generated color palette and style profile for the user may be saved, but not the selfie image itself.

The selfie is communicated to the service, which operates the color engine application to identify color characteristics of the user from the selfie. The service analyzes these results and requests information on compatible/enhancing wearables from the e-commerce server (coats, shoes, other clothing etc.) This information on products is provided back to the user's web browser, from which they make product selections and place orders.

Figure 2:
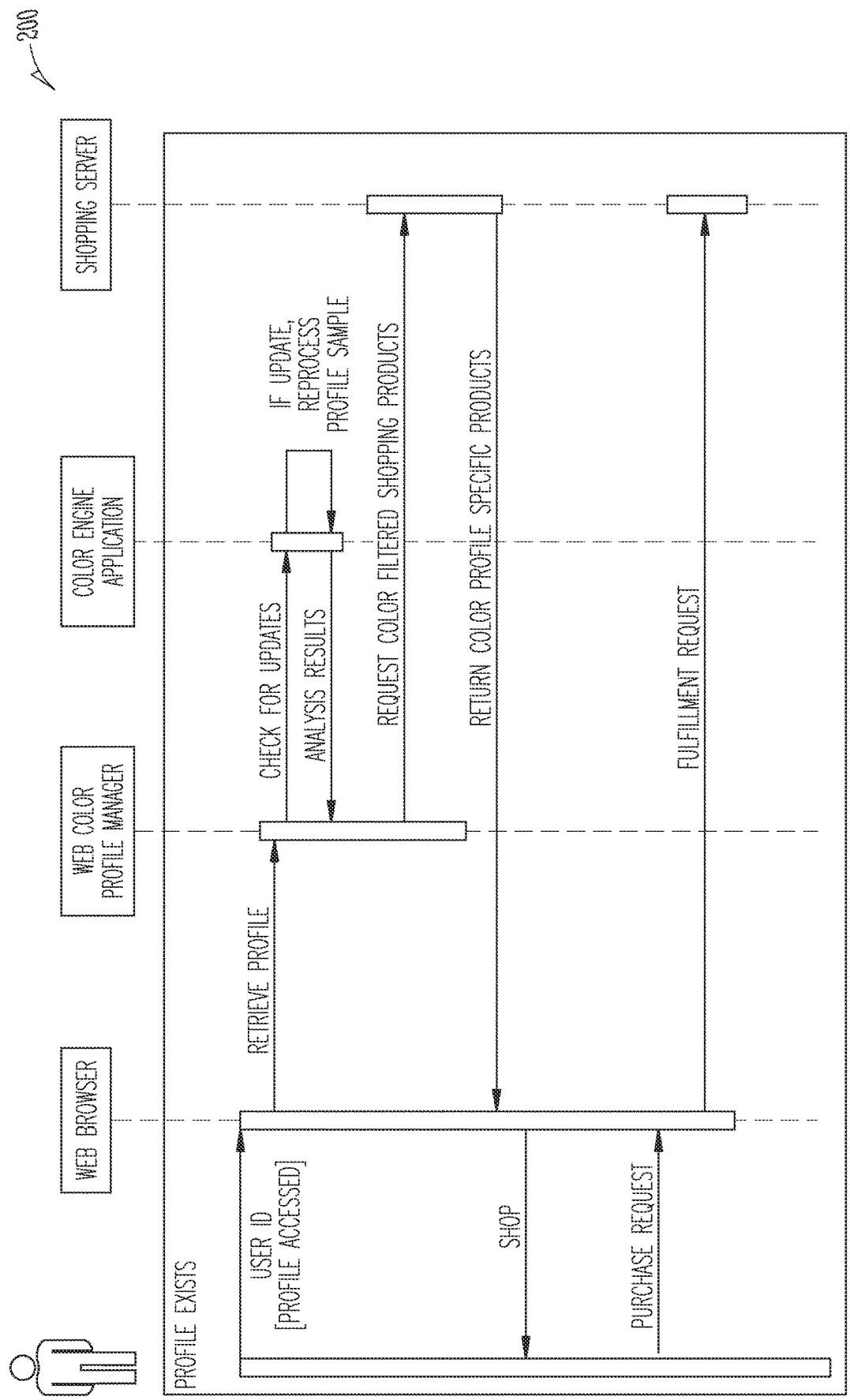
FIG. 2 illustrates an embodiment a purchase fulfillment process 200 in which the user profile already exists, including a selfie.

FIG. 2 illustrates an embodiment of a purchase fulfillment process 200 in which the user profile already exists, including a selfie. The service checks for updates to the selfie and if they exist, reprocesses the updated selfie for color information. Otherwise, the process is similar to the purchase fulfillment process 100 of FIG. 1, The service analyzes these results and requests information on compatible/enhancing wearables from the e-commerce server (coats, shoes, other clothing etc.) This information on products is provided back to the user's web browser, from which they make product selections and place orders.

Figure 3:
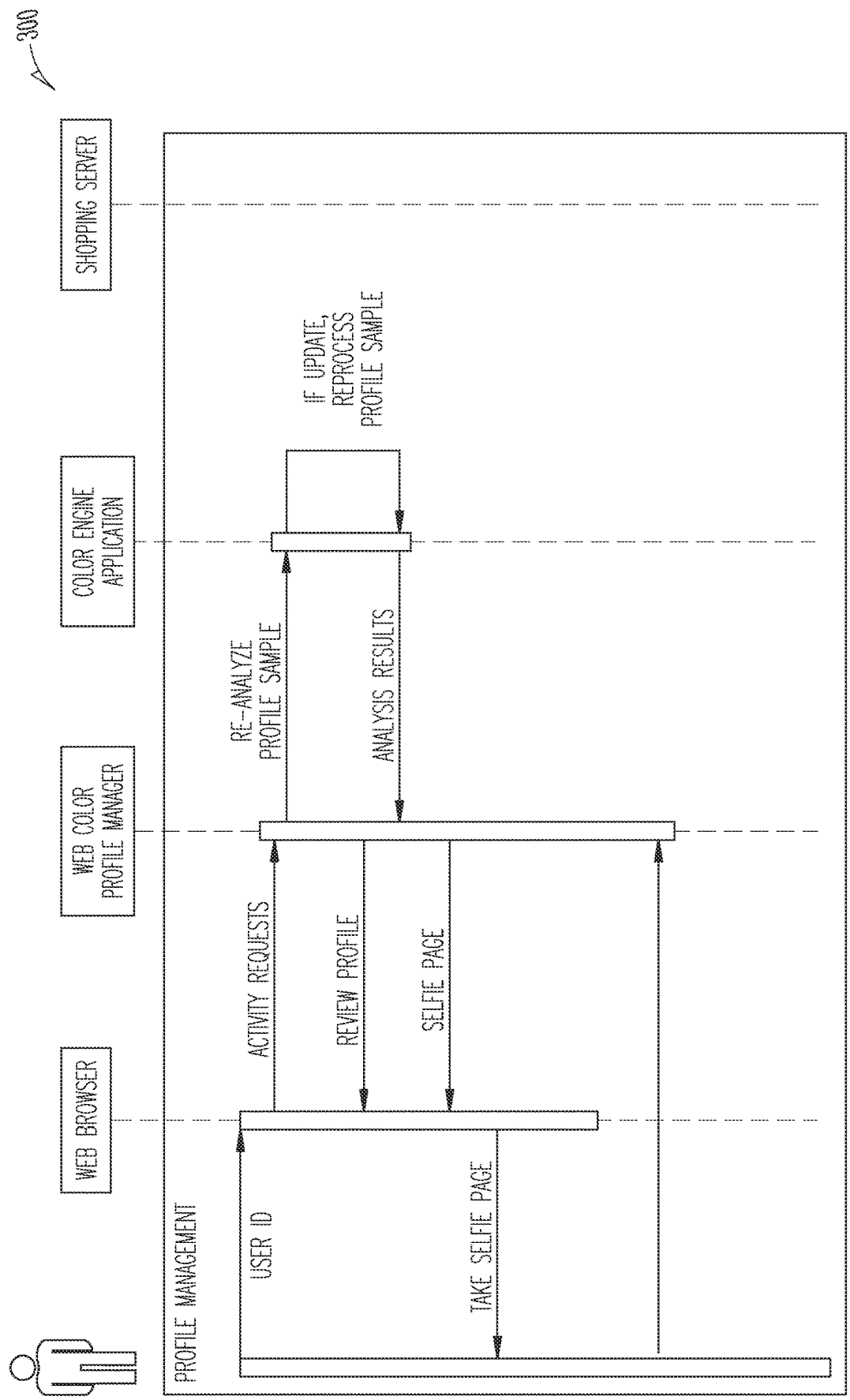
FIG. 3 illustrates an embodiment of a user profile management process 300.

FIG. 3 illustrates an embodiment of a user profile management process 300. The service receives activity requests such as an updated selfie from the user's web browser. The service operates the color engine application to re-analyze the updated selfie and update color characteristics in the user's profile.

Figure 4:
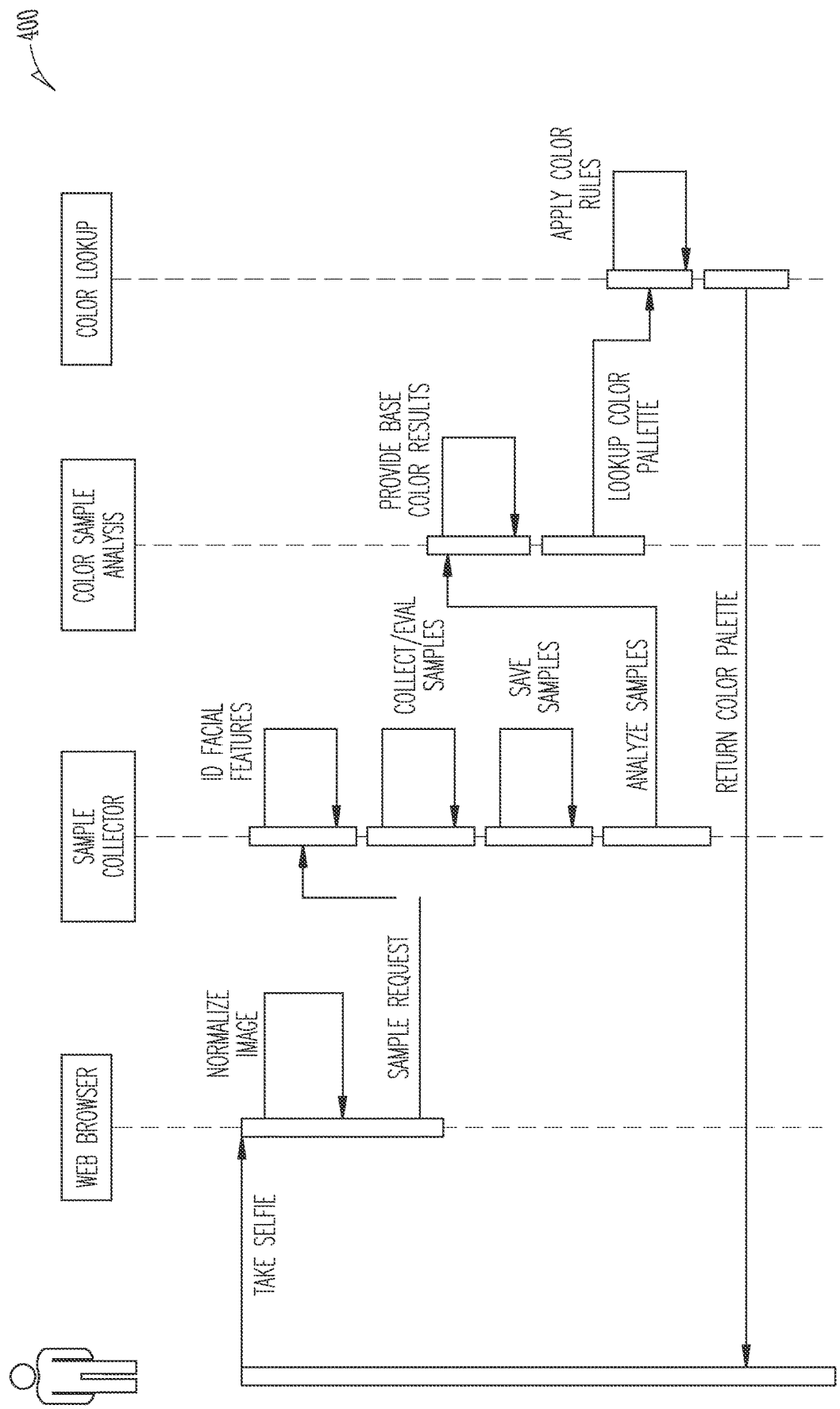
FIG. 4 illustrates an embodiment of a color engine process 400.

FIG. 4 illustrates an embodiment of a color engine process 400. A provided selfie is first normalized (e.g., corrected for glare and other wide-range intensity or color values). Image normalization is well understood in the art. The image is then sampled by sample collection logic which extracts, collects, and saves facial features. These are analyzed for color content by color sample analysis logic, and base color results from the analysis are used to look up a well-matched color palette for the user's face based on configured lookup rules/associations. The determined color palette is returned to the user (e.g., via the user's web browser), and/or is stored in the user's profile.

Normalization may adjust the image toward a more "standard" distribution of colors/intensities regardless of the camera that is used, and a quality index may be created. The index measures whether the image is good enough quality to continue with the process. Products like brightness, color saturation etc. are used/adjusted during the normalization and quality index generation processes. If the image quality is unsatisfactory then the user may be prompted to take another picture and provided tips on how to improve the image.

Identifying facial features may include identifying facial skin areas, hair, eyes, mouth/lips, eyebrows, and beard, if present. Location and angularity of these features may be determined. Results enable the color engine to help with identifying complimentary patterns in clothing.

Once the features are identified sample locations are identified. These locations must provide a minimum number of pixels which are consistent with a normal sample. If that cannot be achieved, then a new location for that feature is selected. If a feature is not available for sampling, the color engine process 400 makes adjustments to the logic and continues.

Once the facial feature locations are identified, color samples are collected from these features. Hair color, skin color, eye color, lip color, and eyebrow color may be sampled individually. Several areas from each feature should be sampled.

Each sample is evaluated statistically to determine if it is homogeneous enough to be typed, or if there are outliers in the sample that need to be removed. Variance within a sample is important and the application will need to have adjustable controls in place to ensure results match the complexity of the feature samples.

A difference or distance between two colors may be measured as a difference in terms of color temperature. The color temperature of a color is the temperature of an ideal black-body radiator that radiates light of that color. Homogeneity of a color sample may also be measured in terms of color temperature. Alternatively, a difference or distance between two colors may also be measured as a distance within a color space, a color space being a specific organization of colors. A color space may be arbitrary, with particular colors assigned to a set of physical color swatches, as the Pantone collection, or structured mathematically, as NCS System, Adobe RGB or sRGB. The difference between two colors can be measured as a Euclidean distance or as a CIELAB Delta E distance. Euclidean distances or CIELAB Delta E distances may also be used to compute an average color of a sample or a color homogeneity of a sample. If a sample is not determined to be suitable quality, a new sample is taken from the same feature area, and the new sample is then evaluated for quality. If a feature is not available for sampling or a clean sample of suitable quality cannot be collected, it is noted and the decision logic is updated.

Once each sample is validated, the sample and statistics about the sample are saved into a database for future reference.

After sample calculations are completed the color engine process 400 continues to a decision matrix where with parameters set based on some of the primary features sampled. The skin and hair color and contrast are primary features, for example. From this information and the decision matrix the color engine process 400 determines base and complimentary colors.

Base colors are the primary color set from which a color profile is built. From the base colors a primary color palette is identified. This is the starting point of a personalized color profile. It has been determined that while some users may not need major adjustments to the primary color palette, most people have many nuances to their facial design which requires some adjustments to be made.

Secondary samples are used to enhance and adjust the generated color palette which may or may not need colors added to or removed from it. Colors can be affiliated with each other based on hue, which then can be added, or removed, from the personalized version of the color profile.

Accessory colors are identified in the process, as well as the suitable metal colors. Contract colors may be added to the personal profile as well. Each person has a unique facial structure which lends itself to different patterns which enhance a person's look. These patterns are identified, in one embodiment, as subtle, obvious and strong.

The personalized color palette is saved into a set of database tables (see the exemplary table schemas in FIGS. 5-8) for use later. If the user chooses to create and account, the account is associated to the color profile. If not, the profile is still saved but with no personal identifiable data, only sample patches of the selfie image and calculated statistics from the image.

The data collected by the color engine process 400 provides the user with insight to aid them in shopping for products which enhance their appearance. Integration of the color engine with a fashion shopping website may thus improve the user's shopping experience. The analysis data also aids when making order from suppliers of fashion. The data may be analyzed to aid designers and buyers for specific labels with information about the composition of shopper colors. This will help ensure designers are meeting the needs of their customers and providing a balance of colors which enhance the customers look and the choices they can make.

Once the data is stored the reference to the color profile is handed back to the service. The handoff data may take a variety of forms depending on the purpose and use of the information. An array of colors, used for matching seller's inventory, could be one form. A reference to the color profile is another possible form.

Figure 5:
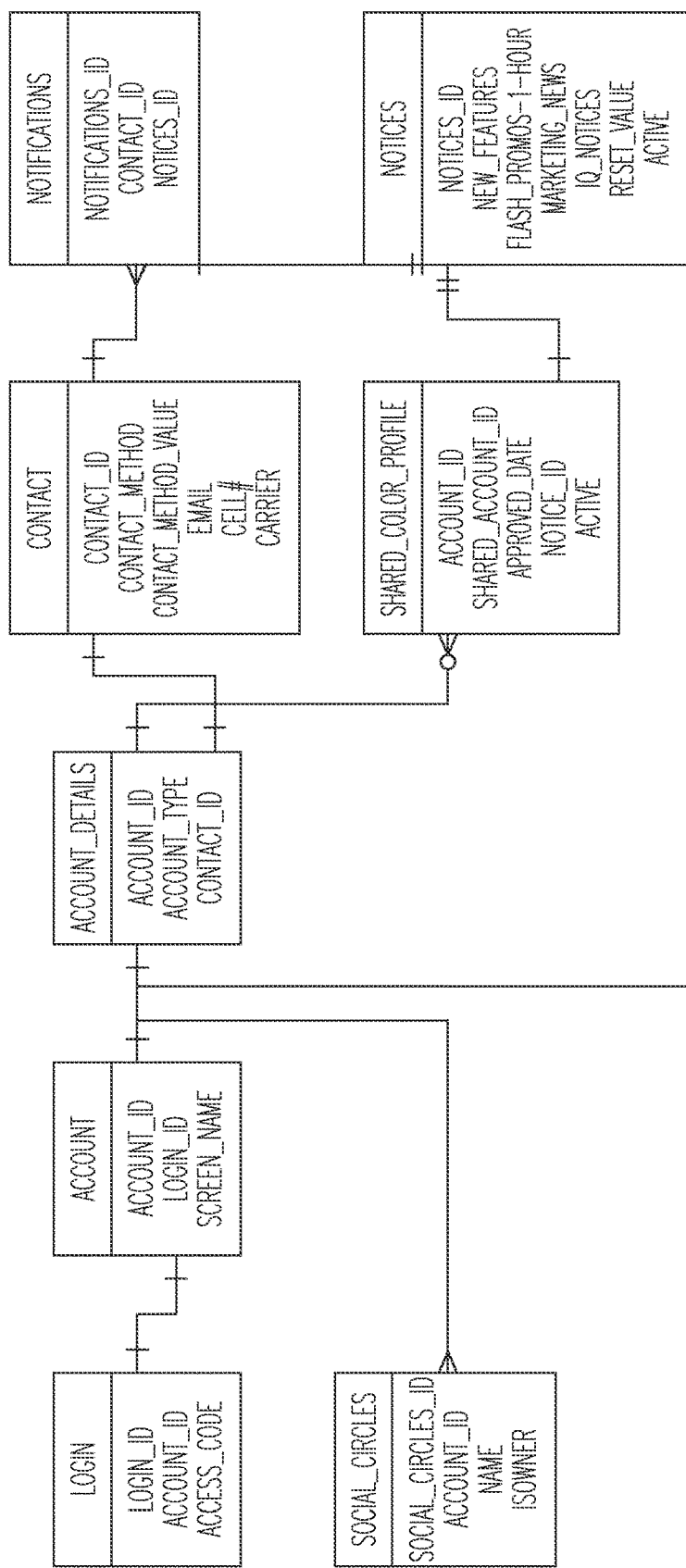
FIG. 5 illustrates a machine memory schema 500 for implementing an embodiment of a color engine.
Figure 6:
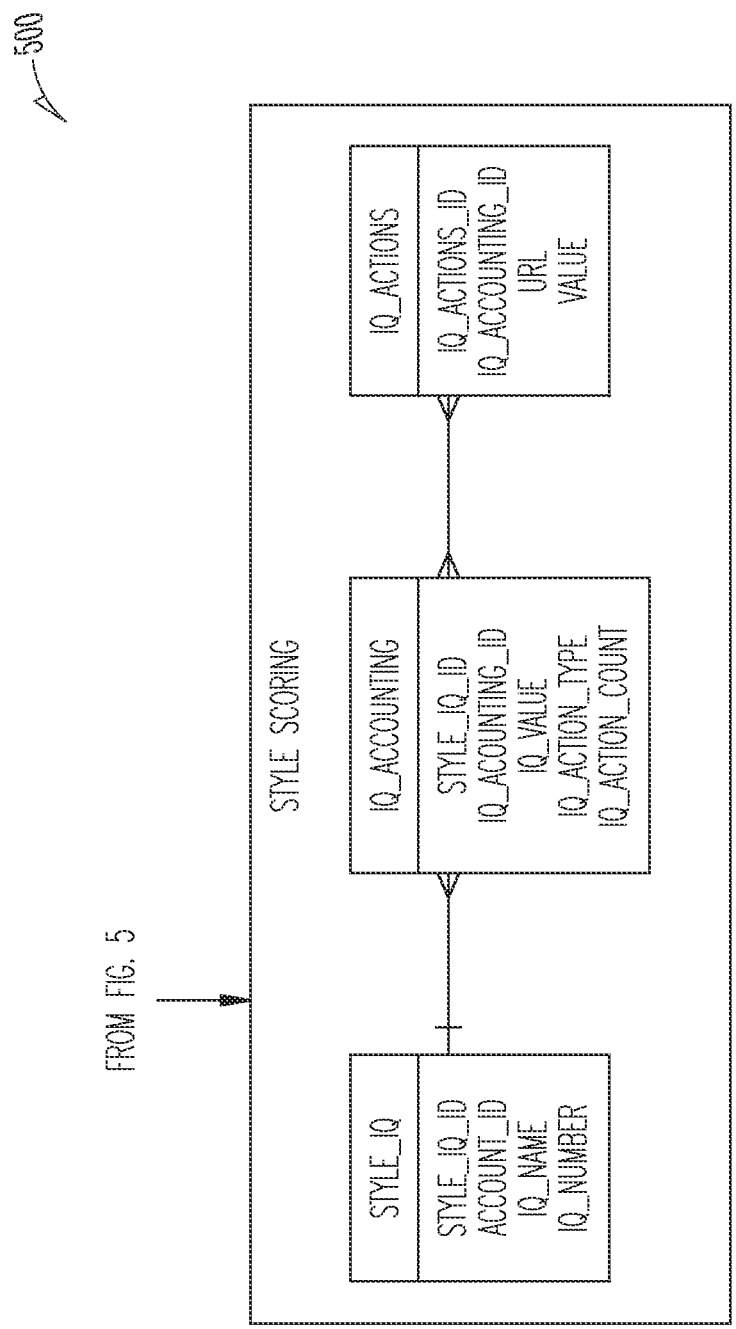
FIG. 6 further illustrates a machine memory schema 500 for implement an embodiment of a color engine.

FIG. 5 and FIG. 6 illustrate a machine memory schema 500 in accordance with implementing an embodiment of a color engine and the processes described above. The machine memory schema 500 enables various functionality of the color engine, such as user authentication (login), utilization of demographics, StyleIQ Points, notifications, social groups, shopping history, and profile sharing.

Figure 7:
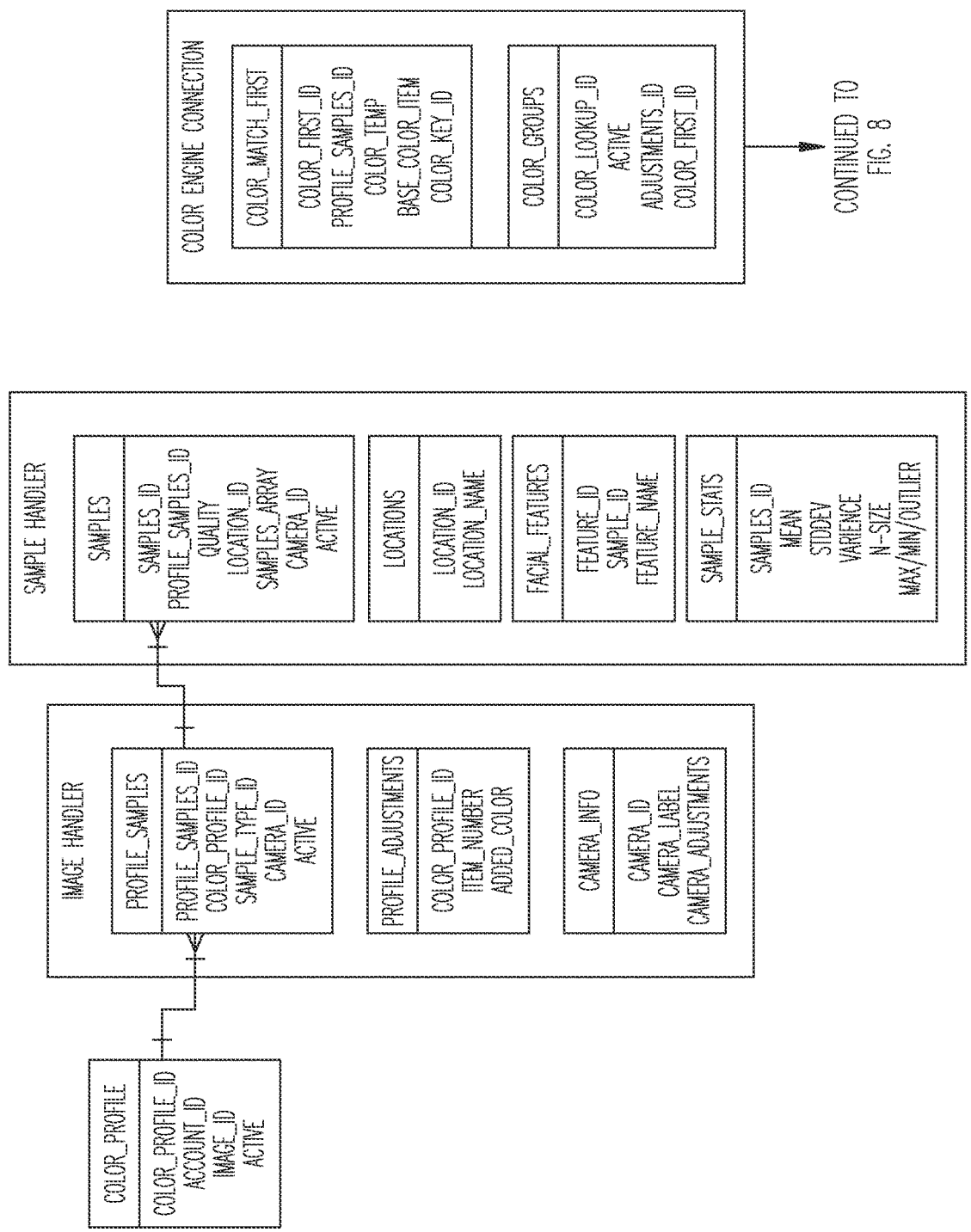
FIG. 7 illustrates a machine memory schema 700 for implementing an embodiment of a color engine.
Figure 8:
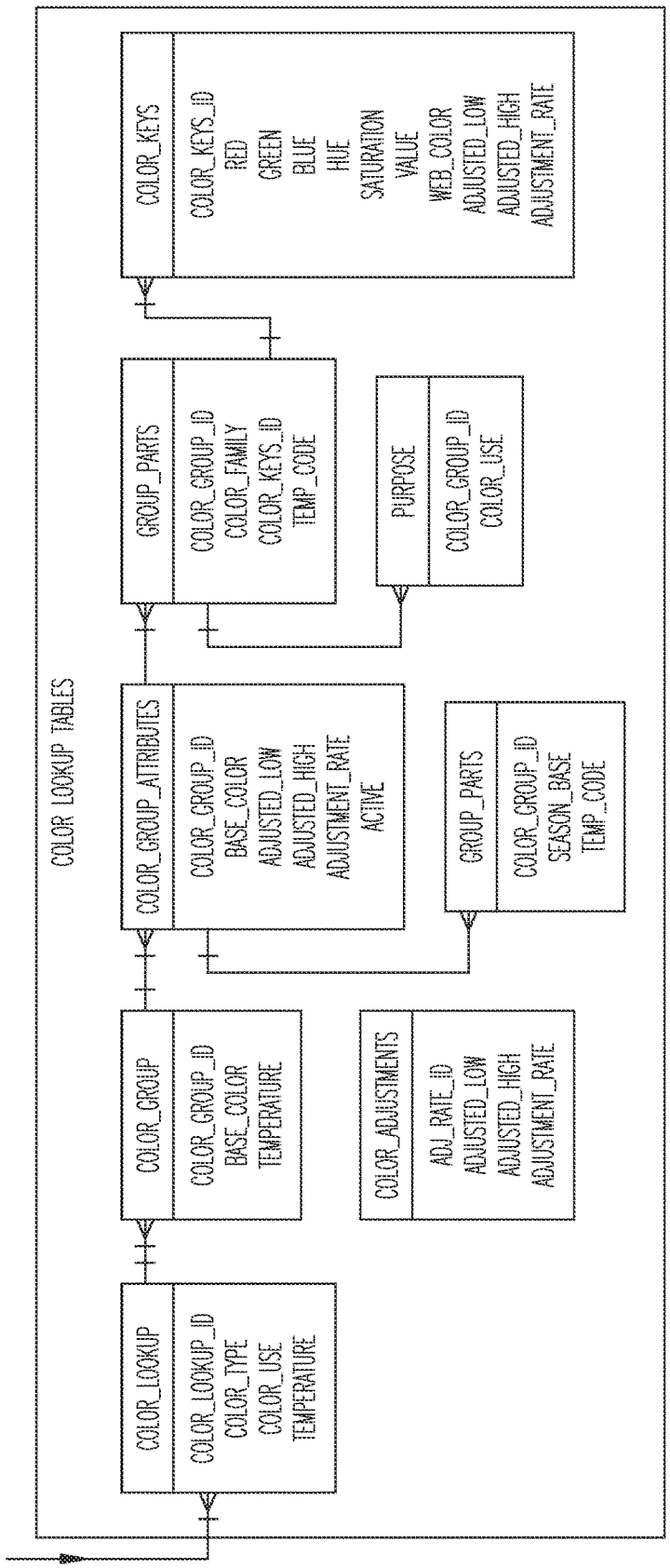
FIG. 8 illustrates additional aspects of a machine memory schema 700 for implementing an embodiment of a color engine.

FIG. 7 and FIG. 8 illustrate a machine memory schema 700 in accordance with implementing an embodiment of a color engine. The machine memory schema 700 enables various functionality of the color engine, such as image and sample handling, and color matching and processing by the color engine.

Example values in the color lookup table (FIG. 8) include neutrals, metals, neons, base, fresh, essential, typical, and deep (types), and warm and cold (temperatures). Example values for the color_use fields include coats, shoes, pants, shirts, and accessories.

Figure 9:
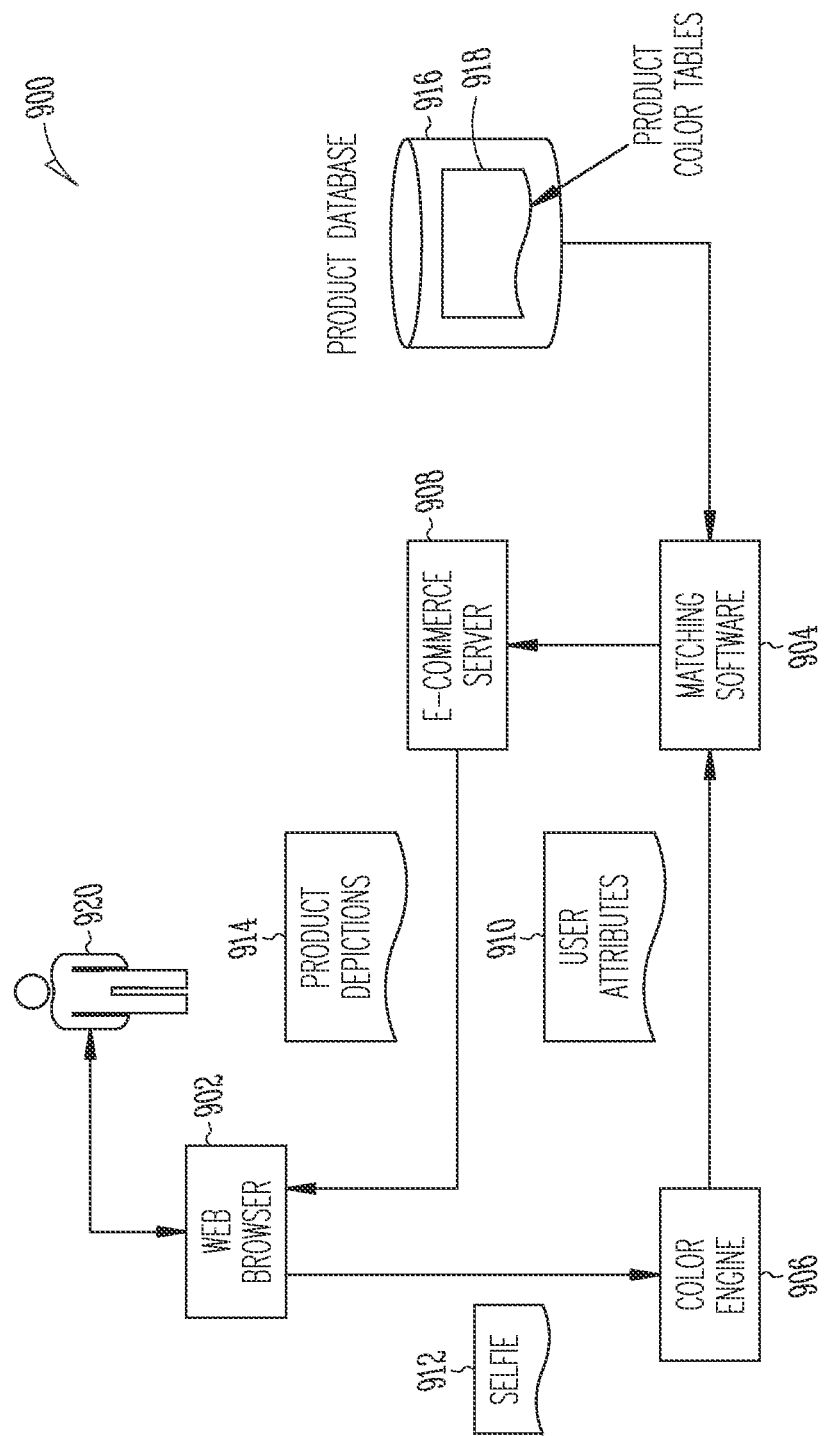
FIG. 9 illustrates an e-commerce system 900 in accordance with one embodiment.

FIG. 9 illustrates an e-commerce system 900 in accordance with one embodiment. The e-commerce system 900 comprises matching software 904, a color engine 906, an e-commerce server 908, and a product database 916.

A user 920 takes a selfie 912 and uploads the selfie 912 to the color engine 906 via the web browser 902. The color engine 906 generates user attributes 910 (color characteristics, age, gender, etc.) from the selfie 912 and communicates the user attributes 910 to the matching software 904.

The matching software 904 inputs the user attributes 910 from the color engine 906 and product color tables 918 from the product database 916 and provides a set of products matching the user attributes 910 (especially regarding color coordination) to the e-commerce server 908. The e-commerce server 908 communicates product depictions 914 of the matching products back to the web browser 902 for consideration and selection by the user 920.

Figure 10:
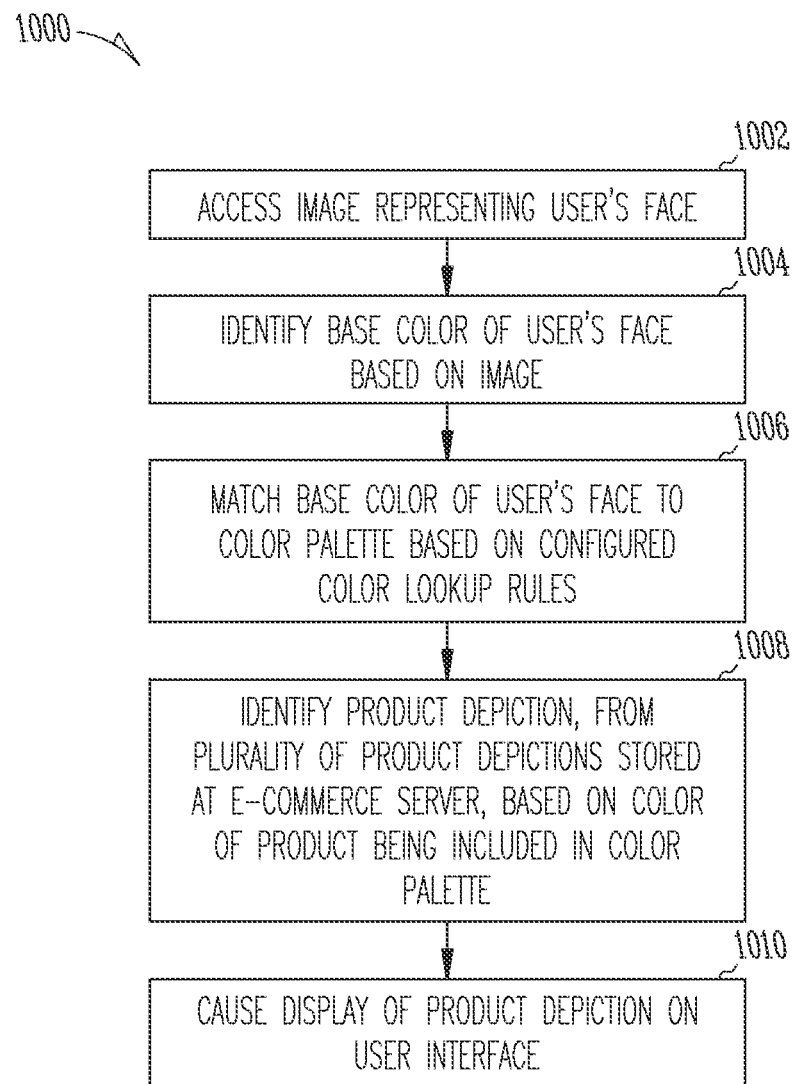
FIGS. 10 to 14 are flowcharts illustrating example methods for recommending products based on a user's color signature, in accordance with various example embodiments.

FIG. 10 is a flowchart 1000 illustrating an example method for recommending products based on a user's color signature, according to an example embodiment. At operation 1002, the color engine 906 accesses an image representing a user's face. At operation 1004, the color engine 906 identifies a base color of the user's face based on the image. At operation 1006, the matching software 904 matches the base color of the user's face to a color palette based on configured color lookup rules. At operation 1008, the matching software 904 accessed the e-commerce server, retrieves a plurality of product depictions 914 stored at the e-commerce server 908, and identifies a product depiction, from the plurality of product depictions 914, based on a color of the product being included in the color palette. At operation 1010, the web browser 902 causes the display of the product depiction on a user interface. The product depiction might be displayed alongside an interactive user element for accessing the e-commerce web site or for directly purchasing the product on the e-commerce web site.

Figure 11:
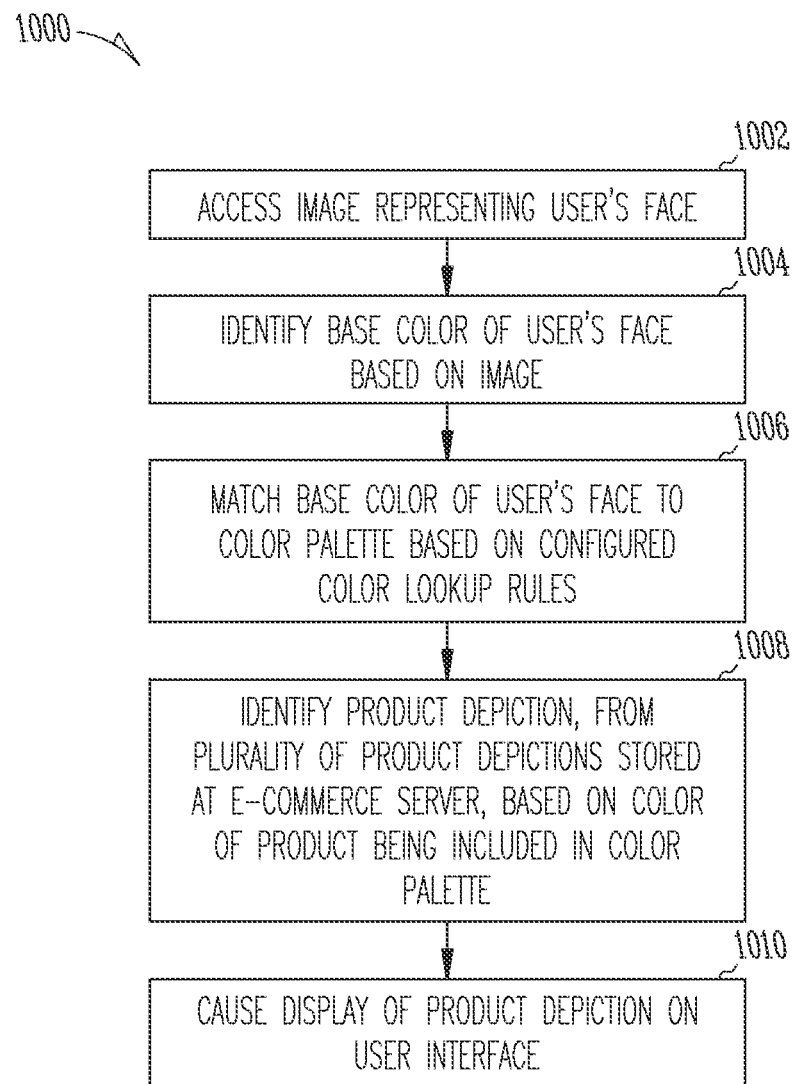

FIG. 11 is a flowchart 1100 illustrating another example method for recommending products based on a user's color signature, according to another example embodiment. In addition to operations 1102, 1104, and 1106 that are similar to operations 1002, 1004, and 1006 and will not be described again, at operation 1108, the color engine 906 identifies a facial feature of the user based on the image. Facial features might include skin areas, hair, eyes, mouth/lips, eyebrows, and beard, if present. At operation 1110, the matching software matches the facial feature to a group of patterns based on configured pattern lookup rules. At operation 1112, the matching software 904 accessed the e-commerce server 908, retrieves a plurality of product depictions stored at an e-commerce server, and identifies one or more product depictions, from the plurality of product depictions, based on a color of the product(s) being included in the color palette, and on a pattern of the product(s) being included in the group of patterns. Operation 1114 is similar to operation 1010 and will not be described again.

Figure 12:
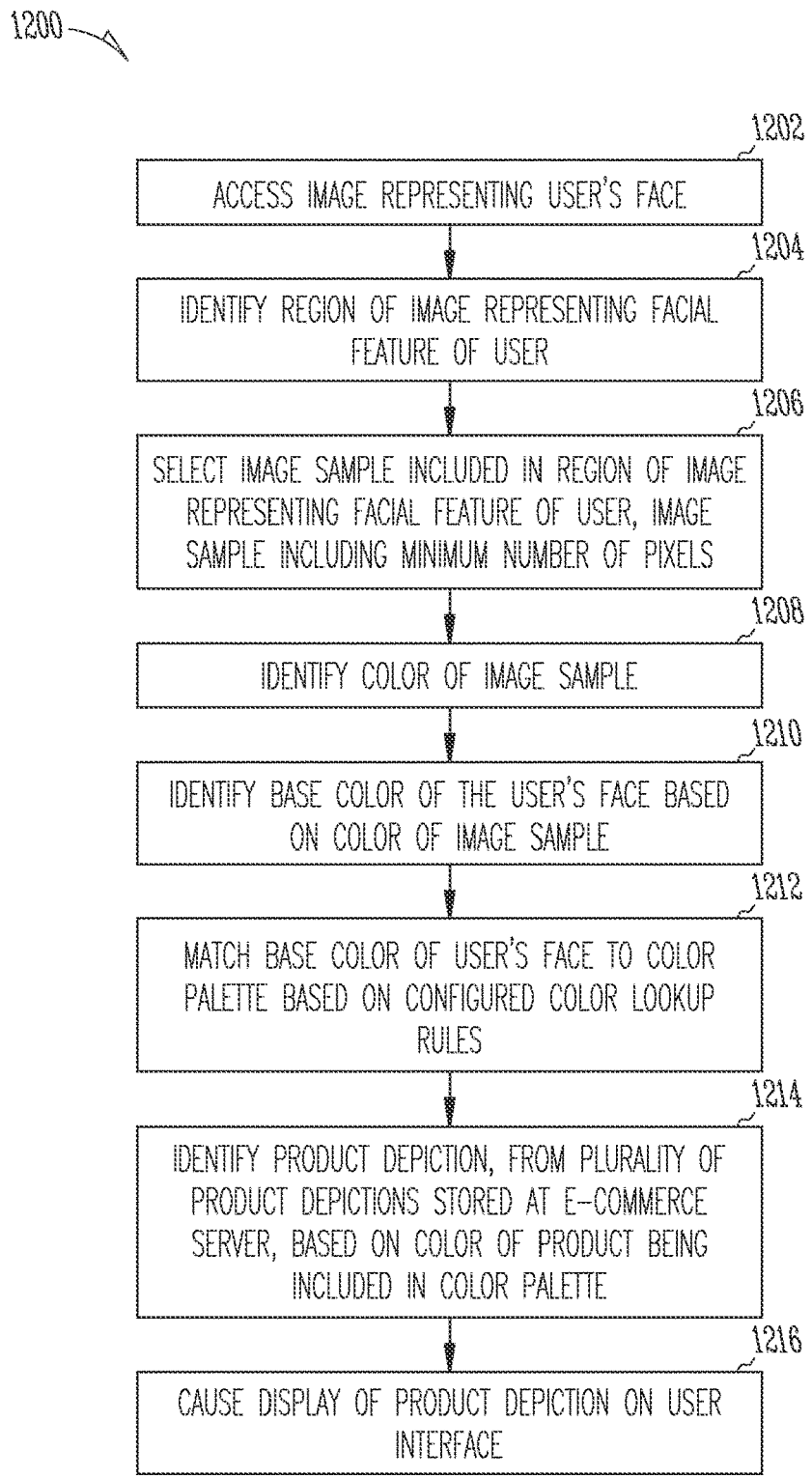

FIG. 12 is a flowchart 1200 illustrating another example method for recommending products based on a user's color signature, according to another example embodiment. In addition to operation 1202 that is similar to operations 1002 and will not be described again, at operation 1204, the color engine 906 identifies a region of the image representing a facial feature. At operation 1206, the color engine 906 selects one or more sample(s) included in the region of the image representing the facial feature, each sample including a minimum number of pixels. At operation 1208, the color engine 906 identifies, for each image sample, a color of the sample based on the color of the pixels of the image sample. At operation 1210, the color engine 906 identifies the base color of the user's face based on the color of the image sample(s). For example, the base color is identified as an average of the colors of the image samples. The average may be weighted based on the number of pixels of each image sample. Operations 1212, 1214, and 1216 are similar to operations 1006, 1008, and 1010 and will not be described again.

Figure 13:
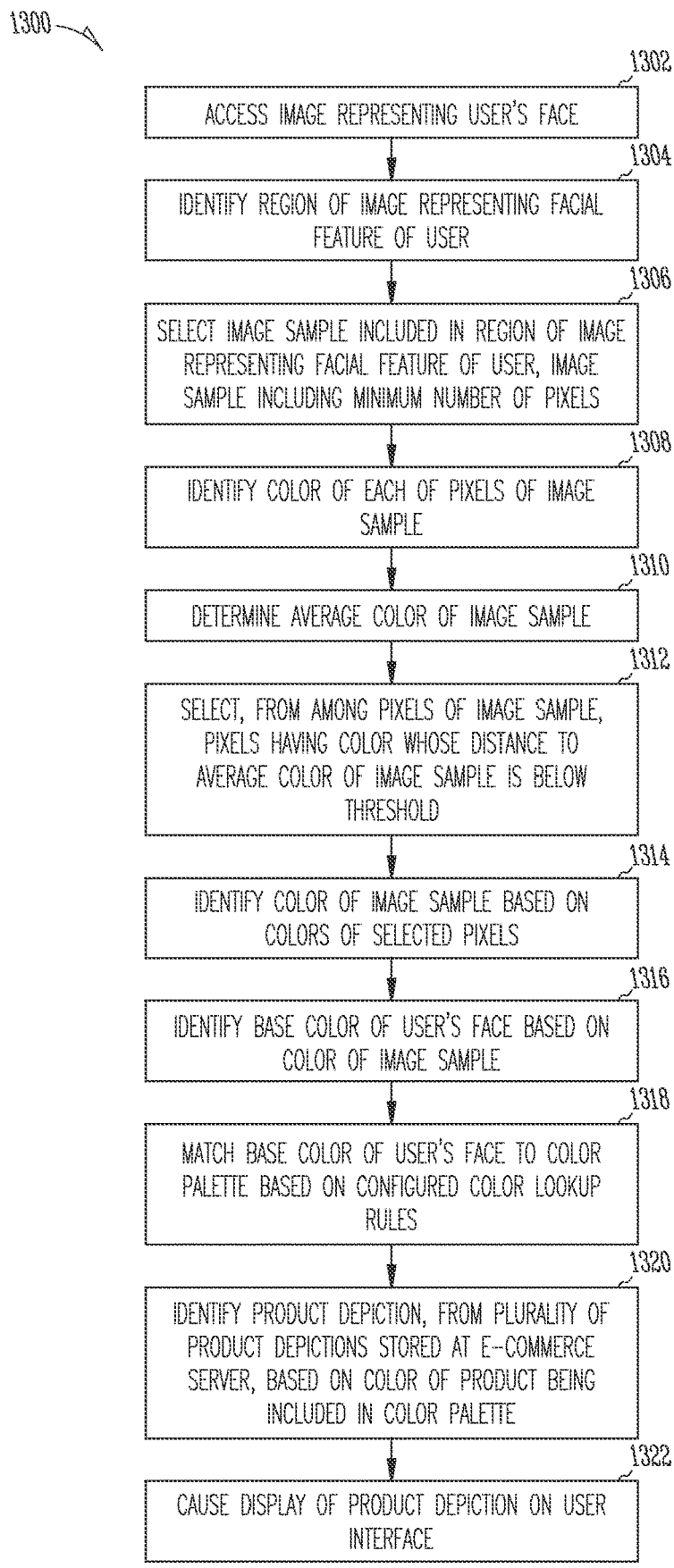

FIG. 13 is a flowchart 1300 illustrating another example method for recommending products based on a user's color signature, according to another example embodiment. In addition to operation 1302 that is similar to operations 1002 and will not be described again, and operations 1304, 1306, 1308 that are respectively similar to operations 1204, 1206, 1208 and will not be described again, at operation 1310, the color engine 906 determines, for each image sample, an average color of the image sample. At operation 1312, the color engine 906 selects, for each image sample, from among the pixels of the image sample, pixels having a color whose distance to the average color of the image sample is below a threshold. At operation 1314, the color engine 906 identifies, for each image sample, a color of the image sample based on the color of the selected pixels of the image sample. At operation 1316, the color engine 906 identifies the base color based on the colors of the image samples. For example, the base color is identified as an average of the colors of the image samples. The average may be weighted based on the number of selected pixels of each image sample. Operations 1318, 1320, and 1322 are similar to operations 1006, 1008, and 1010 and will not be described again.

Figure 14:
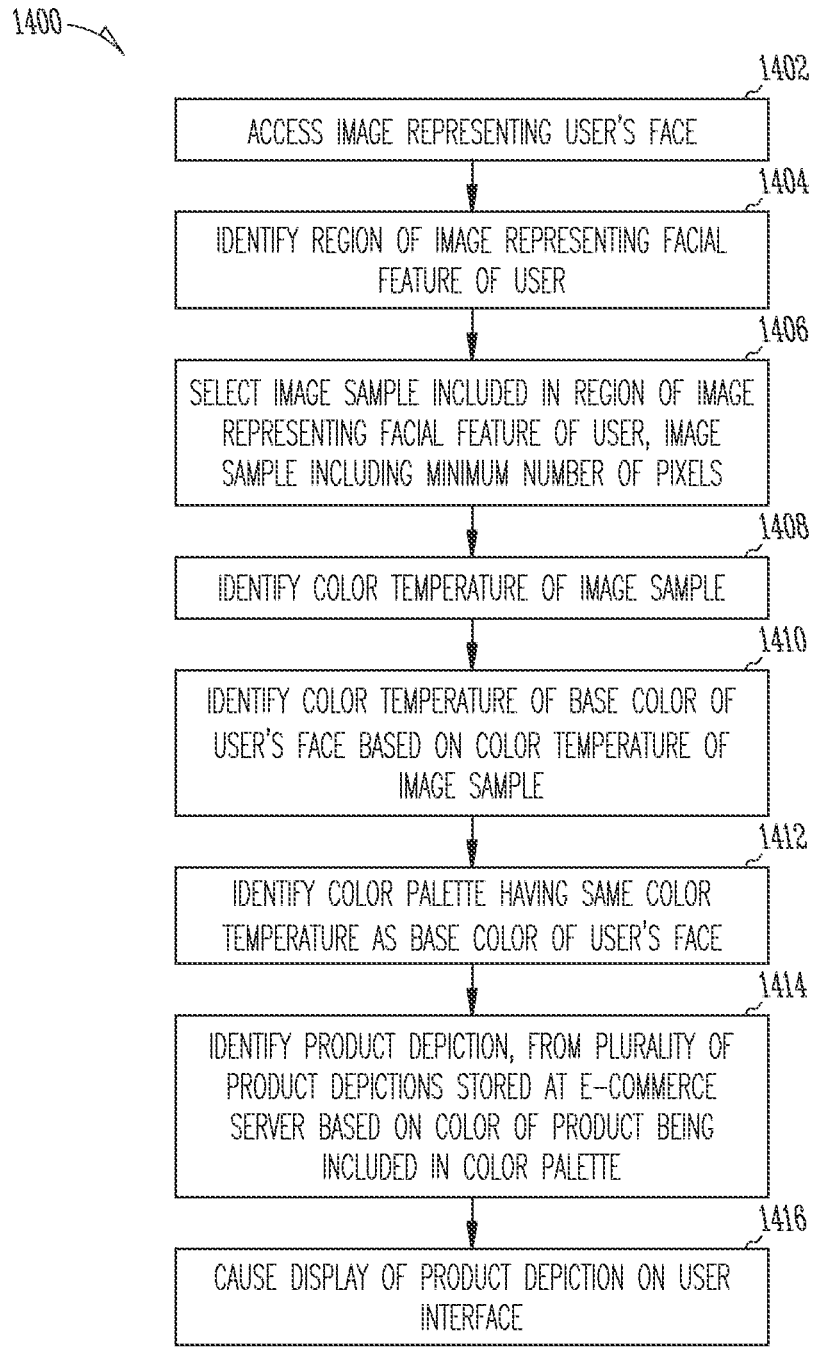

FIG. 14 is a flowchart 1400 illustrating another example method for recommending products based on a user's color signature, according to another example embodiment. In addition to operation 1402 that is similar to operations 1002 and will not be described again, and operations 1404 and 1406 that are respectively similar to operations 2104 and 2106 and will not be described again, the color engine 906 identifies, at operation 1408, a color temperature of each of the image sample(s). At operation 1410, the color engine 906 identifies the color temperature of the base color based on the color temperatures of the image sample(s). For example, color temperature of the base color is identified as an average of the color temperatures of the colors of the image samples. The average may be weighted based on the number of pixels of each image sample. At operation 1412, the color engine 906 matches the base color of the user's face to a color palette by identifying a color palette having the same color temperature as the base color of the user's face. Operations 1414 and 1416 are respectively similar to operations 1008 and 1010 and will not be described again.

Figure 15:
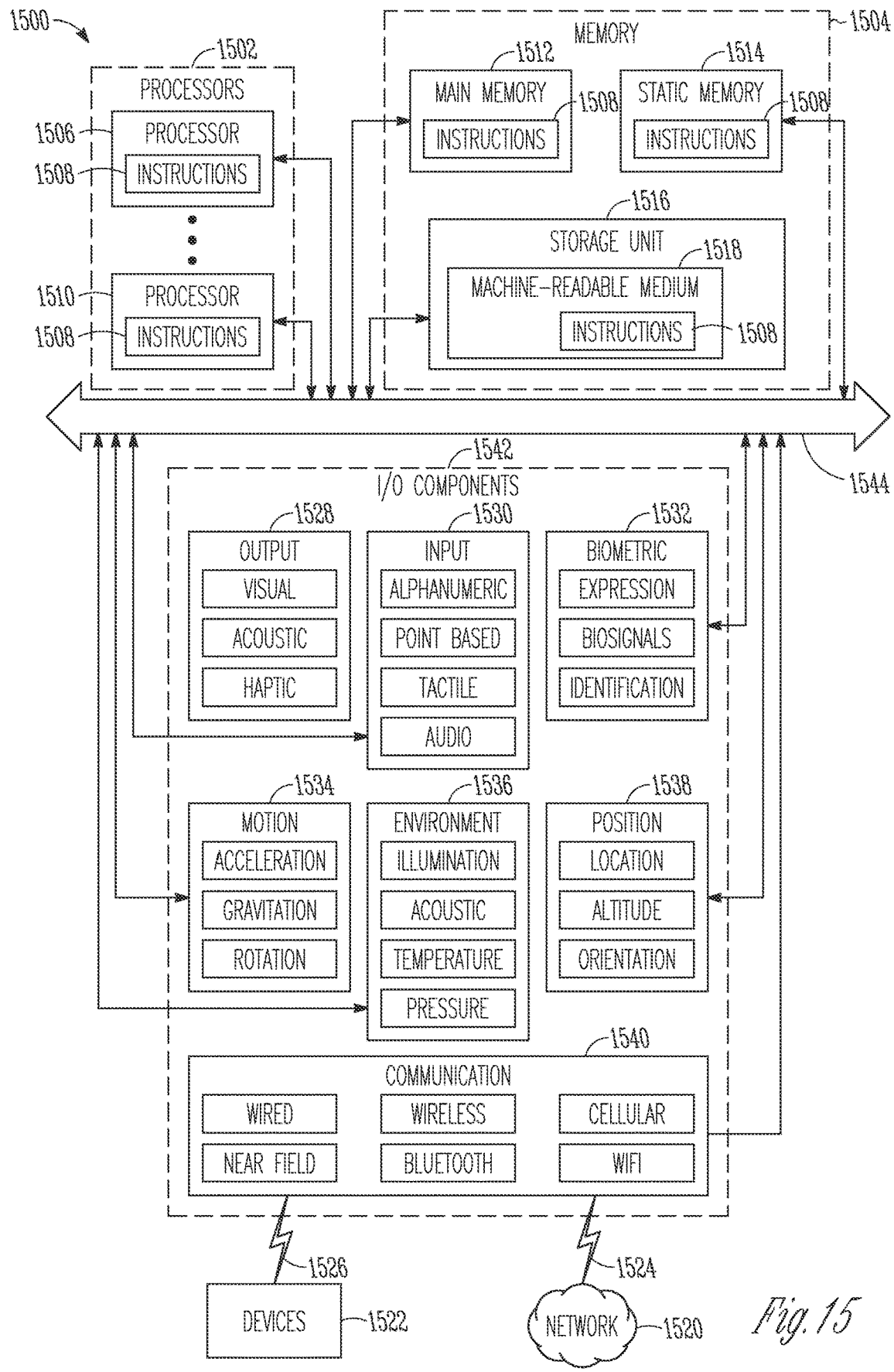
FIG. 15 illustrates a diagrammatic representation of an example machine in the form of a computer system within which a set of instructions may be executed for causing the machine to perform any one or more of the methodologies discussed herein, in accordance with an example embodiment.

FIG. 15 illustrates a diagrammatic representation of a machine 1500 in the form of a computer system within which a set of instructions may be executed for causing the machine to perform any one or more of the methodologies discussed herein, according to an example embodiment. Specifically, FIG. 15 shows a diagrammatic representation of the machine 1500 in the example form of a computer system, within which instructions 1508 (e.g., software, a program, an application, an applet, an app, or other executable code) for causing the machine 1500 to perform any one or more of the methodologies discussed herein may be executed. For example, the instructions 1508 may cause the machine 1500 to execute the method XYZ of FIG. 15. Additionally, or alternatively, the instructions 1508 may implement FIGS. X-X, and so forth. The instructions 1508 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machine 1500 that individually or jointly execute the instructions 1508 to perform any one or more of the methodologies discussed herein.

The machine 1500 may include processors 1502, memory 1504, and I/O components 1542, which may be configured to communicate with each other such as via a bus 1544. In an example embodiment, the processors 1502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1506 and a processor 1510 that may execute the instructions 1508. The term "processor" is intended to include multi-core processors that may comprise two or more independent processors (sometimes referred to as "cores") that may execute instructions contemporaneously. Although FIG. 15 shows multiple processors 1502, the machine 1500 may include a single processor with a single core, a single processor with multiple cores (e.g., a multi-core processor), multiple processors with a single core, multiple processors with multiples cores, or any combination thereof.

The memory 1504 may include a main memory 1512, a static memory 1514, and a storage unit 1516, both accessible to the processors 1502 such as via the bus 1544. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the processors 1502 (e.g., within the processor's cache memory), or any suitable combination thereof, during execution thereof by the machine 1500.

The I/O components 1542 may include a wide variety of components to receive input, provide output, produce output, transmit information, exchange information, capture measurements, and so on. The specific I/O components 1542 that are included in a particular machine will depend on the type of machine. For example, portable machines such as mobile phones will likely include a touch input device or other such input mechanisms, while a headless server machine will likely not include such a touch input device. It will be appreciated that the I/O components 1542 may include many other components that are not shown in FIG. 15. The I/O components 1542 are grouped according to functionality merely for simplifying the following discussion and the grouping is in no way limiting. In various example embodiments, the I/O components 1542 may include output components 1528 and input components 1530. The output components 1528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1542 may include biometric components 1532, motion components 1534, environmental components 1536, or position components 1538, among a wide array of other components. For example, the biometric components 1532 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 may include acceleration sensor components (e.g., accelerometer), gravitation sensor components, rotation sensor components (e.g., gyroscope), and so forth. The environmental components 1536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1542 may include communication components 1540 operable to couple the machine 1500 to a network 1520 or devices 1522 via a coupling 1524 and a coupling 1526, respectively. For example, the communication components 1540 may include a network interface component or another suitable device to interface with the network 1520. In further examples, the communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1522 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., memory 1504, main memory 1512, static memory 1514, and/or memory of the processors 1502) and/or storage unit 1516 may store one or more sets of instructions and data structures (e.g., software) embodying or used by any one or more of the methodologies or functions described herein. These instructions (e.g., the instructions 1508), when executed by processors 1502, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1520 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1520 or a portion of the network 1520 may include a wireless or cellular network, and the coupling 1524 may be a Code Division Multiple Access (CDMA) connection, a Global System for Mobile communications (GSM) connection, or another type of cellular or wireless coupling. In this example, the coupling 1524 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1508 may be transmitted or received over the network 1520 using a transmission medium via a network interface device (e.g., a network interface component included in the communication components 1540) and utilizing any one of a number of well-known transfer protocols (e.g., hypertext transfer protocol (HTTP)). Similarly, the instructions 1508 may be transmitted or received using a transmission medium via the coupling 1526 (e.g., a peer-to-peer coupling) to the devices 1522. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1508 for execution by the machine 1500, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Figure 16:
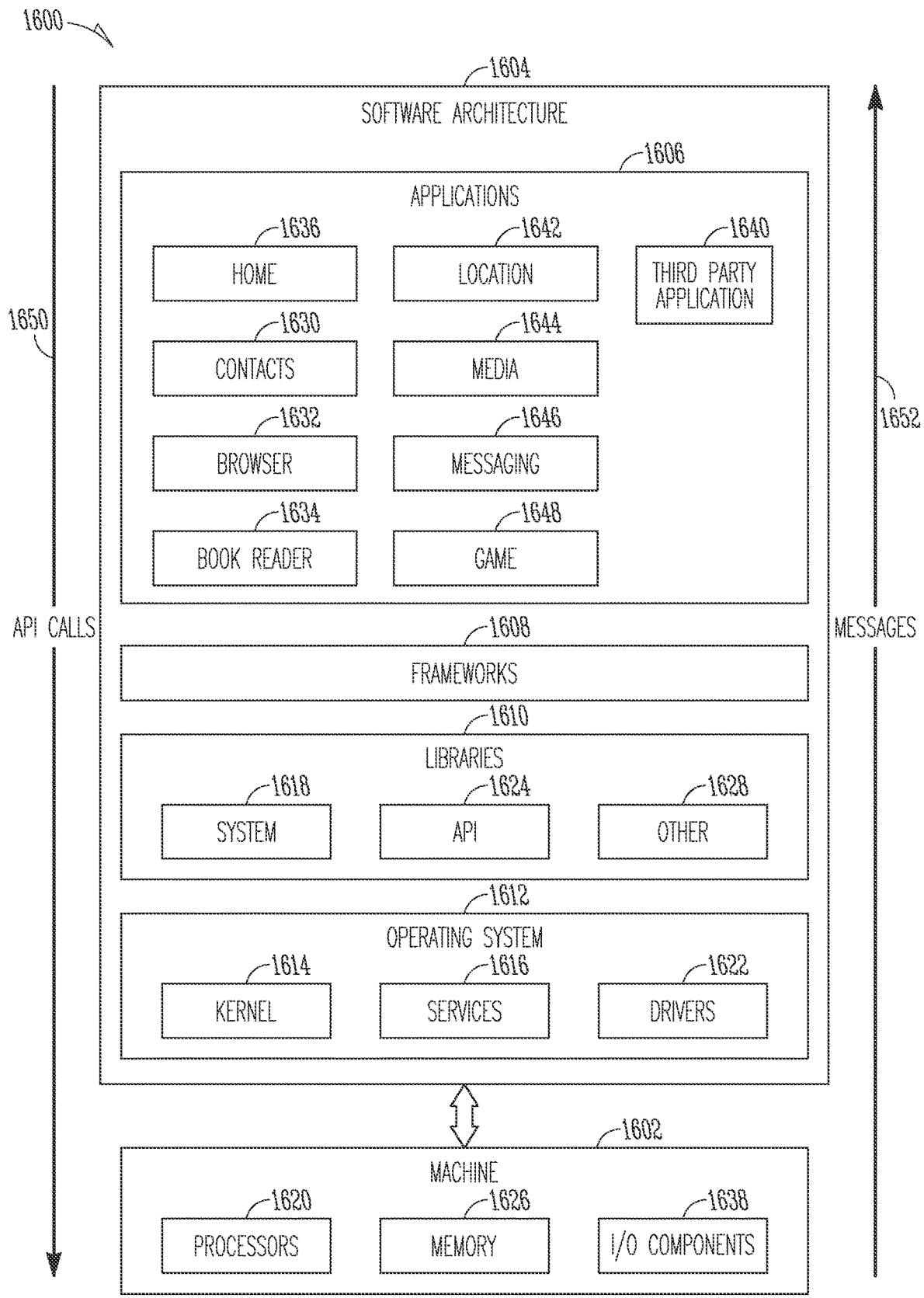
FIG. 16 illustrates a block diagram of an example software architecture.

FIG. 16 is a block diagram 1600 illustrating a software architecture 1604, which can be installed on any one or more of the devices described above. FIG. 16 is merely a non-limiting example of a software architecture, and it will be appreciated that many other architectures can be implemented to facilitate the functionality described herein. In various embodiments, the software architecture 1604 is implemented by hardware such as a machine 1602 of FIG. 2 that includes processors 1620, memory 1626, and I/O components 1638. In this example architecture, the software 102 can be conceptualized as a stack of layers where each layer may provide a particular functionality. For example, the software 102 includes layers such as an operating system 1612, libraries 1610, frameworks 1608, and applications 1606. Operationally, the applications 1606 invoke application programming interface (API) calls 112 through the software stack and receive messages 1652 in response to the API calls 1650, consistent with some embodiments.

In various implementations, the operating system 1612 manages hardware resources and provides common services. The operating system 1612 includes, for example, a kernel 1614, services 1616, and drivers 1622. The kernel 1614 acts as an abstraction layer between the hardware and the other software layers, consistent with some embodiments. For example, the kernel 1614 provides memory management, processor management (e.g., scheduling), component management, networking, and security settings, among other functionality. The services 1616 can provide other common services for the other software layers. The drivers 1622 are responsible for controlling or interfacing with the underlying hardware, according to some embodiments. For instance, the drivers 1622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1610 provide a low-level common infrastructure used by the applications 1606. The libraries 1610 can include system libraries 1618 (e.g., C standard library) that can provide functions such as memory allocation functions, string manipulation functions, mathematic functions, and the like. In addition, the libraries 1610 can include API libraries 1624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1610 can also include a wide variety of other libraries 1628 to provide many other APIs to the applications 1606.

The frameworks 1608 provide a high-level common infrastructure that can be use by the applications 1606, according to some embodiments. For example, the frameworks 1608 provide various graphic user interface (GUI) functions, high-level resource management, high-level location services, and so forth. The frameworks 1608 can provide a broad spectrum of other APIs that can be use by the applications 1606, some of which may be specific to a particular operating system or platform.

In an example embodiment, the applications 1606 include a home application 1636, a contacts application 1630, a browser application 1632, a book reader application 1634, a location application 1642, a media application 1644, a messaging application 1646, a game application 1648, and a broad assortment of other applications such as a third-party application 1640. According to some embodiments, the applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In a specific example, the third-party application 1640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1640 can invoke the API calls 1650 provided by the operating system 1612 to facilitate functionality described herein.

User Style Profiles

Consistent with some embodiments as set forth in the present disclosure, in addition to performing analyses on a selfie (e.g., a self-taken photo of a portion of a user's body/face) to identify color and color characteristics, a selfie may be provided as input to a style engine or style profile engine that uses one or more pre-trained, machine learning models for purposes of analyzing a face depicted in the selfie and to determine various facial characteristics. As an example, these characteristics may include the shape of a face (e.g., circle, oval, square, triangle, and forth), as well as the position, shape, size, and relative proportions of various lines or other facial features depicted in the image of the face. Combinations of various facial characteristics that have been detected within the selfie image may then be mapped to what is referred to herein as a user's style profile. In essence, a style profile is a digital representation of some combination of facial characteristics (in some instances, including color), which can be used to select products for presentation or recommendation to the user. For instance, once the facial characteristics of a user are determined, a best matching style profile may be selected from several predefined style profiles. Then, matching logic may be applied to match or map various products to the style profile of the user, based on various characteristics of the product(s).

Figure 17:
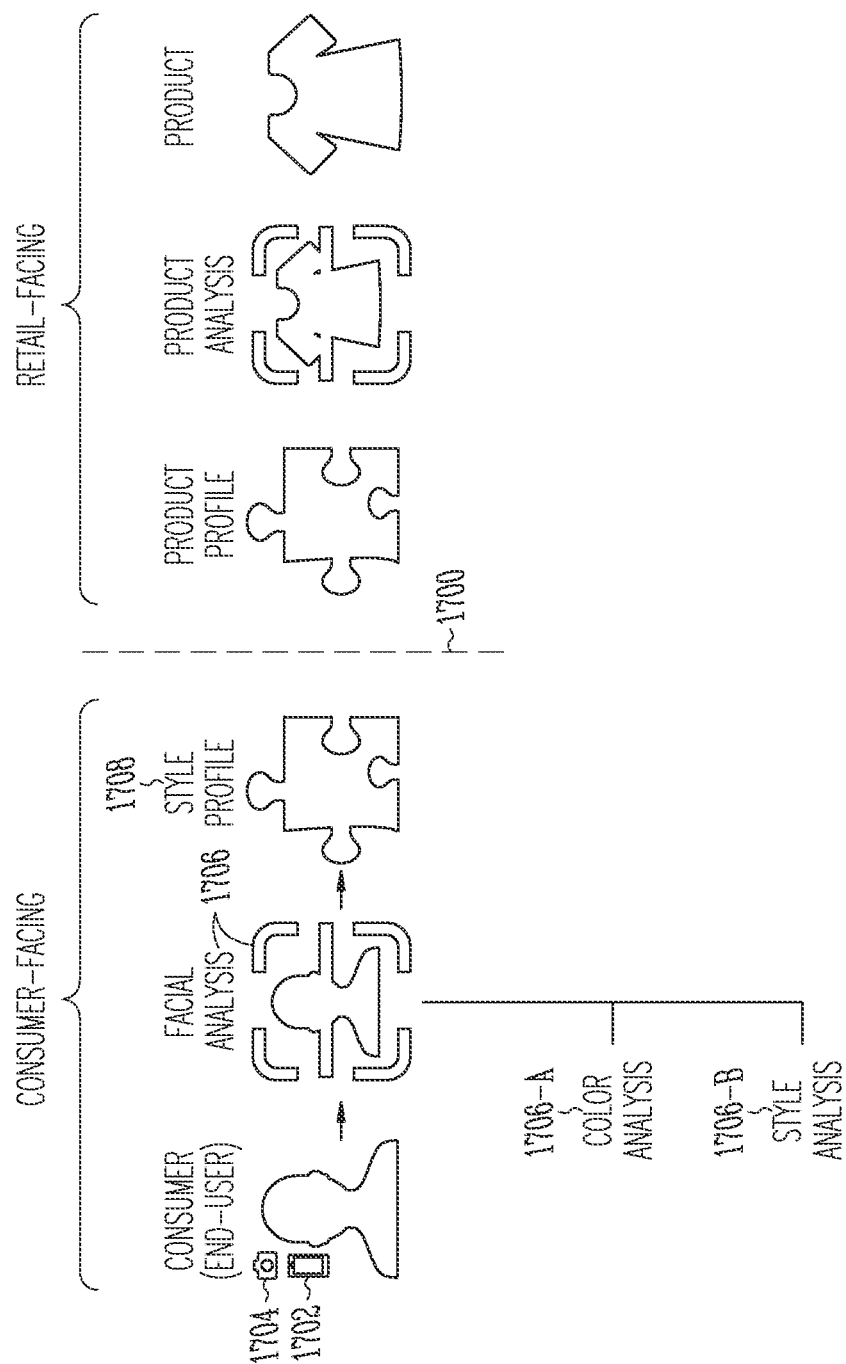
FIG. 17 illustrates an overview of how a system, consistent with embodiments as described herein, may operate to match a user's style profile with various products associated with a product profile.

FIG. 17 illustrates an overview of how a system, consistent with embodiments, may operate to match a user's style profile with various products, where each product is associated with a product profile. As illustrated in FIG. 17, embodiments are one component in a larger platform or system, which can generally be thought of as having two primary components—a consumer-facing component for generating user style profiles, and a commercial- or retail-facing component for analyzing products to create product profiles. As shown in FIG. 17 to the left of the dashed line 1700, a consumer-facing component of the system is primarily aimed at obtaining information from an end-user or simply a user (e.g., a consumer, or potential consumer) for the purpose of generating a digital style profile for the user. Consistent with various embodiments, a user may use any of a variety of devices to capture an image (e.g., a selfie photo). For example, with some embodiments, a mobile application executing on a mobile computing device 1702 (e.g., a smartphone, or similar) may present a user interface that enables the user to operate an image sensor or camera of the mobile computing device to capture a selfie. In other embodiments, a web-based application may have a user interface allowing the user to operate a web cam or similar imaging sensor connected to a laptop or desktop computer. Alternatively, the web-based application may have a user interface allowing for the selection (e.g., a file selection interface), and uploading to a server, of an image captured with an external camera device 1704. Consistent with some embodiments, the image of the user may be obtained from a video clip. For instance, with some embodiments, a video clip that is uploaded to a server may be analyzed to detect within the clip one or more sequential frames that include an image of a face that is suitable for analysis. Accordingly, in some instances, a single frame from the video clip may be selected for analysis, whereas in other instances, it may be the case that multiple frames may be blended (e.g., averaged) or combined in some advantageous way to improve or enhance the image of the user's face. In some examples, the image of the user's face is subject to additional analyses for purposes of detecting facial characteristics.

Consistent with some embodiments, facial analysis 1706 is performed on the selfie that is provided by the user, in order to generate a style profile 1708 for the user. Generally, the facial analysis 1706 can involve both color analysis 1706-A, and style analysis 1706-B. As described in greater detail below, consistent with some embodiments, the style analysis 1706-B involves using one or more machine learned models to analyze the selfie and to detect or recognize certain facial characteristics (e.g., a classification task), such as a shape of the face, characteristics relating to lines present in the image of the face, proportions of the face and/or facial features, detection of various facial features (e.g., cheek dimples, facial hair, etc.), and so forth. With some embodiments, the facial characteristics that are recognized or identified as a result of performing the color analysis and the style analysis are combined for purposes of mapping various combinations of facial characteristics to a single style profile 1708 for the user. In some instances, a user may be assigned or associated with more than one style profile. For example, as described in greater detail below, combinations of facial characteristics may be scored such that a particular style profile may be applicable to a user only when the combined scores of the various facial characteristics that map to a particular style profile exceed some threshold score associated with the style profile. Similarly, in some instances, a confidence score may be associated with various user style profiles such that the confidence score can be used as a metric indicating the extent to which a particular user matches a specific user style profile. In such a scenario, the higher the confidence score is for a particular user style profile, the more likely the user fits or matches the style profile. In some instances, results of the color analyses may be provided separately from the style profile that results from the style analyses. In other instances, various color characteristics may be combined with other characteristics to map a user to a style profile.

In addition to creating a style profile for a user (as shown to the left of dashed line 1700), as shown in FIG. 17, the overall system includes tools and services for analyzing products (e.g., clothes, apparel, attire, accessories, etc.), and related information about those products to the right side of the dashed line 1700, in order to generate for each product a product profile. Similar to a style profile, a product profile is a digital representation of the characteristics of a product. Accordingly, a product profile may encapsulate information about a product, such as, but not limited to: shape, size, fabric, color, and fashion classification. With some embodiments, various rules or matching logic may be used to map a style profile to a product profile. Product selection and recommendation can thus depend on the extent to which a product profile of a product corresponds with or matches criteria set forth to map the product profile to a user's style profile.

Figure 18:
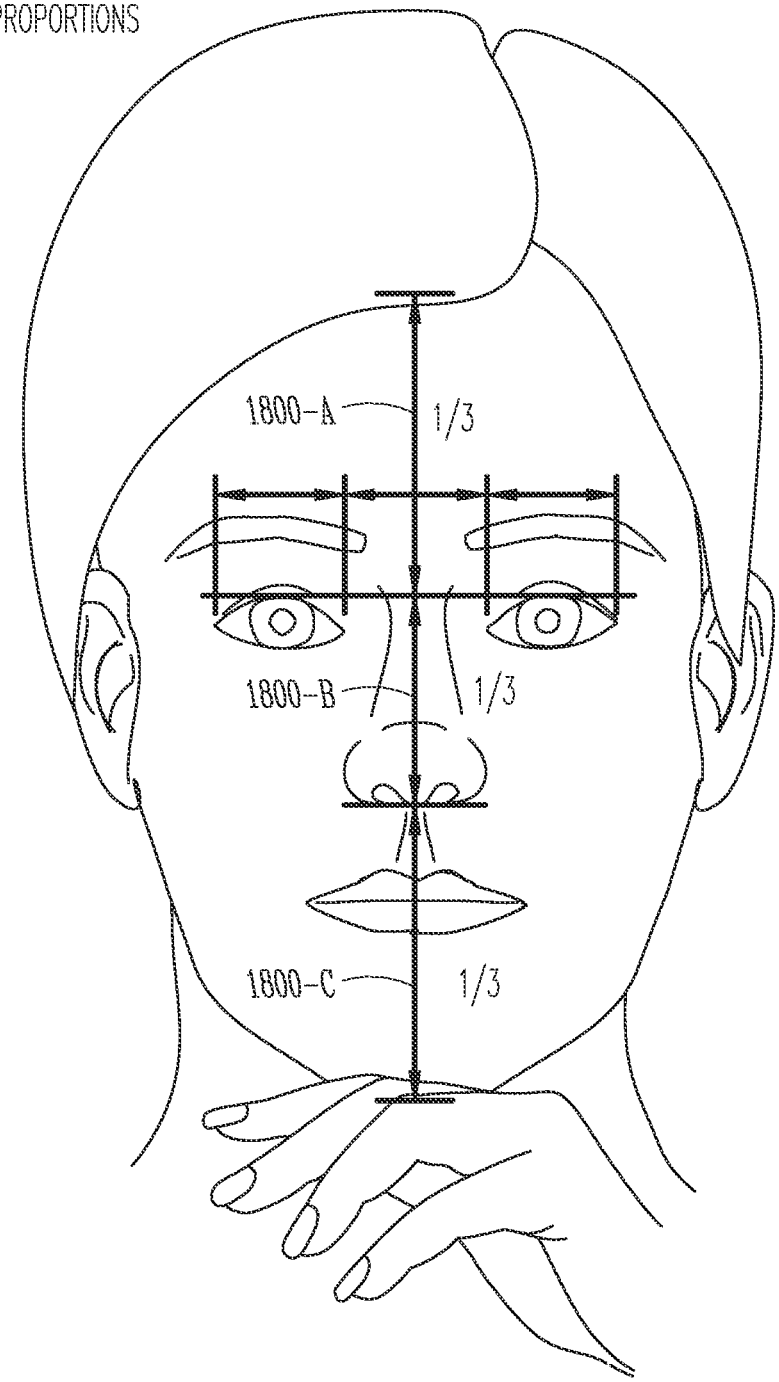
FIG. 18 illustrates an example of the image analysis that may be performed by a machine learned model, using as input a photo (e.g., a selfie), in order to identify certain facial characteristics (e.g., size and proportions) that may be used to assign a user to one of a variety of style profiles.

FIG. 18 illustrates an example of one type of image analysis that may be performed by a machine learned model, the model using as input a photo (e.g., a selfie), in order to identify certain facial characteristics (e.g., size and proportions) that may be used to assign a user to one of a variety of style profiles. As illustrated in FIG. 18, with some embodiments, one or more pre-trained machine learned models may be provided a selfie image as input. The one or more pre-trained machine learned models may generate as output one or more metrics representing the size of a particular facial feature, and/or one or more metrics that represent a proportion (e.g., the relative size) of a particular facial feature relative to another facial feature. Accordingly, in some instances, the output of a particular machine learned model may be a number or metric, for example, representing a physical measurement or length between two facial features detected by the analysis performed by the model. For instance, as shown in FIG. 18, with some embodiments, a machine learned model may output a metric representing the distance from the lowest part of the nose to an imaginary line formed across the highest or top portion of a user's eyes. Similarly, another output may represent a measure of distance between the highest or top portion of a user's eyes and the hairline on the forehead of the user. Finally, another output from a machine learned model may be a number or metric representing the distance or length between a portion of the face detected and identified as the chin and the lowest part of that portion of the face detected as the user's nose. These are just some examples of the many facial features that may be detected and analyzed to generate facial characteristics used to map a user to a style profile.

The one or more pre-trained machine learned models can output similar metrics for other portions or features of a user's face. In other instances, a machine learned model may be a classifier, and the output may be one of several predefined values for a particular facial feature (e.g., [small, medium, large], [round, straight, jagged] and so forth). Of course, other values are possible. With some embodiments, one or more machine learned models may be trained to identify or determine the existence, and location, of specific facial features—such as facial hair (e.g., a mustache, a beard), dimples, wrinkles, hair styles and characteristics, jewelry, and so forth.

Whereas a machine learned model may generate as output a number or metric representing a distance or length between two features detected in the image of the face, multiple outputs may be combined, for example, to generate ratios or proportional measurements. By way of example, as shown in FIG. 18, each of the lines 1800-A, 1800-B and 1800-C, are labeled with the number, one-third ("⅓") to indicate that the respective portions of the user's face are equally proportional that is, the lower, middle and upper portions are all one-third of the total height of the face.

Figure 19:
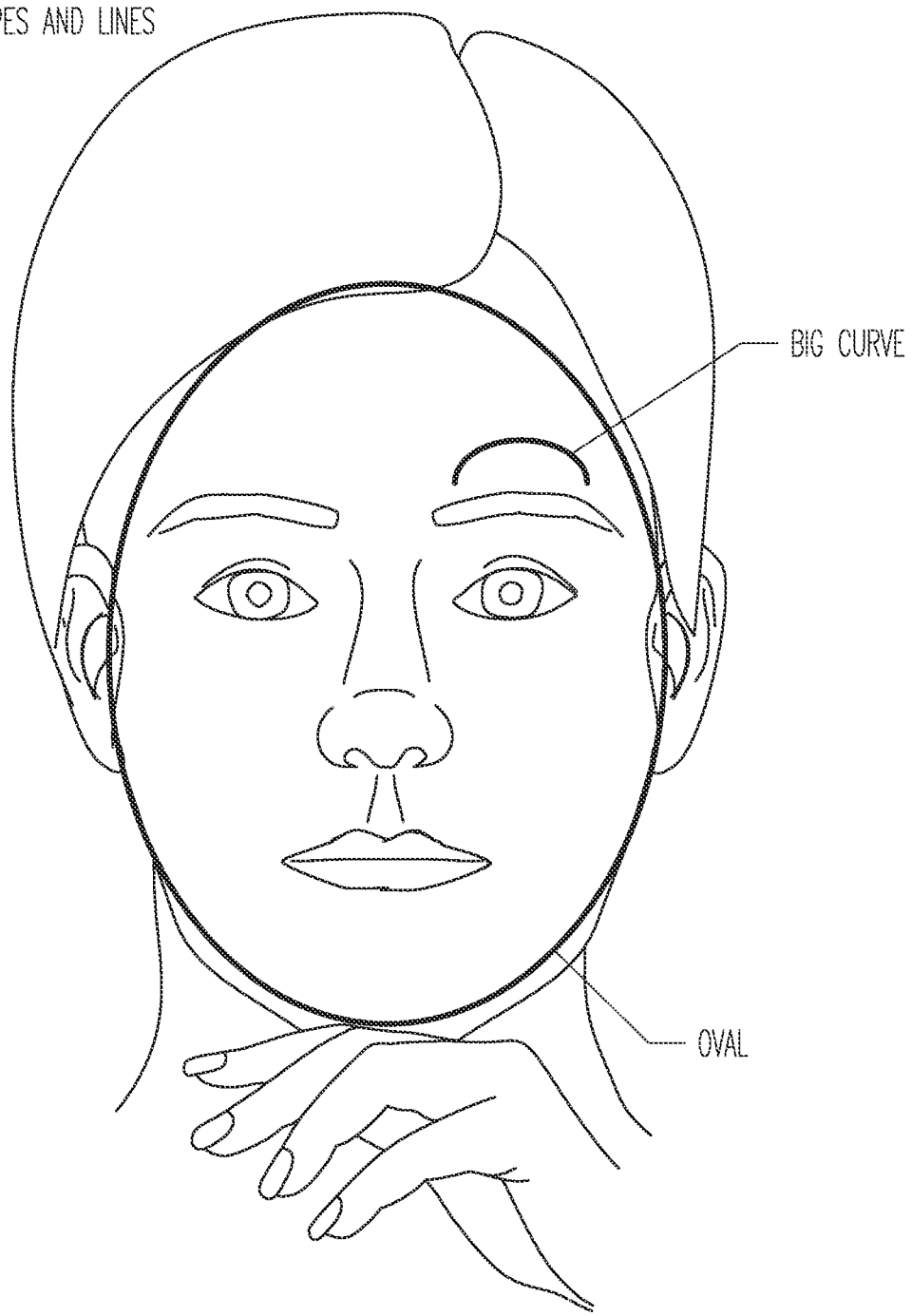
FIG. 19 illustrates another example of image analysis performed using a machine learned model, using as input a photo (e.g., a selfie), in order to obtain or identify certain facial characteristics (e.g., facial shape and facial line characteristics) that may be used to assign a user to one of a variety of style profiles.

FIG. 19 illustrates another example of one type of image analysis that may be performed using a machine learned model, using as input a photo (e.g., a selfie), in order to obtain or identify certain facial characteristics (e.g., facial shape and facial line characteristics) that may be used to assign a user to one of a variety of style profiles. In the example presented in FIG. 19, a user's face is shown and an annotation on the image shows a shape—specifically, an oval shape—that has been detected or recognized by a machine learned model that is using the image as input. FIG. 20 illustrates an example of the many shapes that an automated machine learned model may identify or recognize, consistent with some embodiments, and which may be used to assign a user to one of a number of different style profiles. It will be readily appreciated that the example shapes illustrated in FIG. 20 are only examples, and in various alternative embodiments, a machine learning model could be trained to identify other shapes not shown in FIG. 20. Similarly, alternative embodiments may be implemented to use a subset of the shapes shown in FIG. 20 as well as various combinations of other shapes not shown.

Referring again to FIG. 19, in addition to detecting or recognizing facial shapes, one or more machine learned models may recognize or detect lines on an image of a face. Specifically, and as shown in FIG. 19, one or more machine learned models may receive as input a selfie and analyze the selfie to output information characterizing one or more lines recognized or identified in the face depicted in the selfie. As an example, the output of the model may characterize a face as having straight lines or curved lines. The output of the model may further characterize a metric to express the extent or nature of the curved lines—for example, big curves, small curves, sharp curves, subtle curves, and so forth. Additionally, in some instances, a pretrained machine learned model may determine the position or location of the lines, relative to other facial features. As shown in FIG. 19, a line corresponding with an eyebrow has been detected and recognized as a "big curve." This is just one example of a line that may be detected and classified and in various embodiments, facial lines in other areas of the face may be recognized, characterized and/or classified by a machine learned model. Specifically, with some embodiments, a machine learned model may identify or detect characteristics of lines associated with a jaw (e.g., commonly referred to as a jaw line). In other instances, a machine learned model may be trained to recognize or detect lines that are generally in the area of the cheeks, around one's lips, nose, forehead, ears, and so forth.

The examples presented in connection with FIGS. 18 and 19 have been described to illustrate some of the many facial characteristics that may be detected or identified using approaches that leverage pre-trained machine learned models. It should be noted, and a person of skill in the art would readily understand, that the illustrations shown in FIGS. 18 and 19 are also generally consistent with the nature of the training data that is used in training a machine learning model. For example, the classification task that is performed by a machine learning model can be a supervised machine learning task and, as such, examples of annotated or labeled images of faces are used to train the machine learning models to detect or recognize various facial characteristics. After training the machine learning models with a training dataset, the models may then be used on new images for the purpose of detecting or recognizing facial characteristics. A further discussion of how a machine learning model is trained, for example, using annotated or labeled images similar to what is shown in FIGS. 18 and 19, is presented below in connection with the description of FIG. 23.

FIG. 21 illustrates how, consistent with some embodiments, various combinations of facial characteristics may be mapped to specific user style profiles. Accordingly, when the results of the analyses performed on an image of a face indicate that the face has a specific combination of facial characteristics, the user may be assigned to the style that corresponds with the combination of facial characteristics. As shown in FIG. 21, a table 2100 is shown, with four individual columns. The first three individual columns represent individual facial characteristics. For example, the first column is labeled "facial characteristic #1." By way of example, in various embodiments, this first facial characteristic may be for the detected face shape such that each of the individual values shown in the column represents a different face shape (e.g., circular, ovular, square, and so on). Similarly, the column labeled as, "facial characteristic #2," may represent lines detected in the face, whereas, the column labeled as, "facial characteristic #3," could be a specific characteristic of one or more lines detected in the face (e.g., curved, straight, jagged, short, medium, long and so forth). While only three columns are shown, it will be appreciated that in various alternative embodiments, any number of different facial characteristics may be used in combination to specify a user style profile.

Referring again to FIG. 21, each row in the table 2100 provides or defines a relationship between a combination of facial characteristics and one of several predefined style profiles. For example, as shown by the row with reference 2102, the specific combination of values for the three facial characteristics maps to the style profile generically referred to as "style #5." By way of example, the row 2102 may indicate that the facial shape round (e.g., value #5 for facial characteristic #1), when combined with medium curved eyebrows and medium sized lips, maps to the style profile referred to as "Natural." Accordingly, various combinations of facial characteristics—specifically, the values of the facial characteristic are mapped to various style profiles. With some embodiments, the combinations of facial characteristics may be different for men than it is for women. Accordingly, the table shown in FIG. 21 may be for men, whereas a separate and distinct table—mapping different combinations of facial characteristics to style profiles—may be used for women.

Consistent with some embodiments, a machine learned model may output a single value for a facial characteristic. For example, a model trained to identify or detect facial shapes may output a single value for the characteristic, the output value representing the shape of the face as detected by the model. However, in alternative embodiments, a machine learned model may output a score associated with each of several predefined values. For example, various outputs derived by the machine learned models may be or have scores (e.g., probabilities) which may indicate, for example, a metric representing a likelihood of the user having a given facial characteristic. By way of example, one of the facial characteristics identified by the style analyses is the shape of the face. In some instances, the output of a machine learned model may be a score that is associated with each shape (e.g., circle=0.87, oval=0.79, and square=0.12) that the model is trained to detect. Accordingly, analyses of a particular settle may result in a probability score associated with multiple individual shapes. For instance, a user's facial shape may be classified as circular with a probability (or confidence score) of eighty-seven percent. The same user's facial shape may simultaneously be classified as oval with a probability of seventy-nine percent. Accordingly, with some embodiments, scores associated with each facial characteristic identified by the one or more machine learned models may be combined to derive a final score for each of several predefined combinations of facial characteristics. The final score for a combination of facial characteristics may be compared with a threshold score, and only when the score for a specific combination of facial characteristics exceeds a corresponding threshold, the user may be assigned to the style profile associated with the combination of facial characteristics. Furthermore, just as a probability score (or, confidence score) may be associated with a particular facial characteristic, a probability score (or, confidence score) may also be assigned to and/or associated with a style profile of the user. For example, a user may be assigned to a first style profile (e.g., Natural) with a confidence score of ninety-five percent ("95%") while simultaneously being assigned to a second style profile (e.g., classic) with a confidence score of eighty-nine percent ("89%").

As shown in FIG. 21, the facial characteristics and representative values can be expressed generically. Accordingly, various embodiments might include a variety of facial characteristics—more or less than is shown in FIG. 21, with each facial characteristic having any number of values (e.g., skin color characteristics, facial feature proportions, the presence or absence of certain facial features, such as facial hair, dimples, specific characteristics of the eyes, nose, mouth, hair and so forth).

Although not shown explicitly in FIG. 21, consistent with some embodiments as described herein, a user's style profile may also depend upon how a user answers one or more survey questions that are presented to the user. For example, one or more survey questions may be presented to a user via a web page or a user interface of a mobile application. In some instances, the questions may be designed to specifically differentiate between two or more style profiles. In any case, consistent with some embodiments (though not illustrated in FIG. 21), in addition to a combination of facial characteristics, the answers that a user provides in response to various survey questions may also be used when assigning a user to a specific style profile.

FIG. 22 illustrates an example of how a machine learning algorithm 2200 may be used to train one or more machine learned models 2202. The trained machine learned models can be used to analyze a selfie photo 2204, for the purpose of identifying facial characteristics 2206 of a user, according to some embodiments. Consistent with some embodiments, a supervised machine learning algorithm 2200 may be used to train a machine learned model 2202 to generate an output including, for example, the identity of a facial characteristic detected within the input image 2204. In some instances, the output 2206 of a model may be a score associated with a particular facial characteristic where the score represents a probability score or a confidence score indicating the likelihood that the facial characteristic is actually present within the selfie image. Moreover, in some instances, the model 2202 may output multiples scores for each possible facial characteristic that the model has been trained to detect and/or recognize.

As illustrated in FIG. 22, during a training stage 2208, a machine learning algorithm 2200 or training system is provided with example, annotated, or labeled images (i.e., training data 2210), with the objective of learning a function (i.e., as represented by the model 2202) that will map the example input (i.e., the image) to the output (i.e., the facial characteristic and score). The example inputs and outputs that are used to train the model 2202 are generally referred to as the training data 2210. In this instance, the training data 2210 are annotated images, where the image is the input and the annotation is the expected or desired output. In some instances, the training data 2210 may be obtained from an existing data source for which experts have already annotated the data. However, in other instances, experts may be required to annotate or label the images to generate the training data.

During the training stage 2208, after each instance of training data is processed by the machine learned model 2202 to generate the output(s) 2206 for the input image, an evaluation or optimization operation 2212 is performed to determine how to manipulate the function (e.g., the weights) of the machine learned model 2202 to generate more accurate predictions. For example, the evaluation operation generally involves comparing the predicted output of the machine learned model with the actual output associated with the example input. A loss function can be used to evaluate the performance of the model in generating the desired outputs, based on the provided inputs.

During the training stage 2208, as the training data are provided to the learning system 2200, the weights of the individual neurons of the neural network model 2303 are manipulated to minimize the error or difference, as measured by the loss function. Once fully trained and deployed in a production setting 2214, the model 2202 is provided with a new selfie image 2204 which the model analyzes to detect facial characteristics present in the image. The machine learned model 2202 then generates the scores 2206 that represent the likelihood of specific facial characteristics being present in the image.

Figure 23:
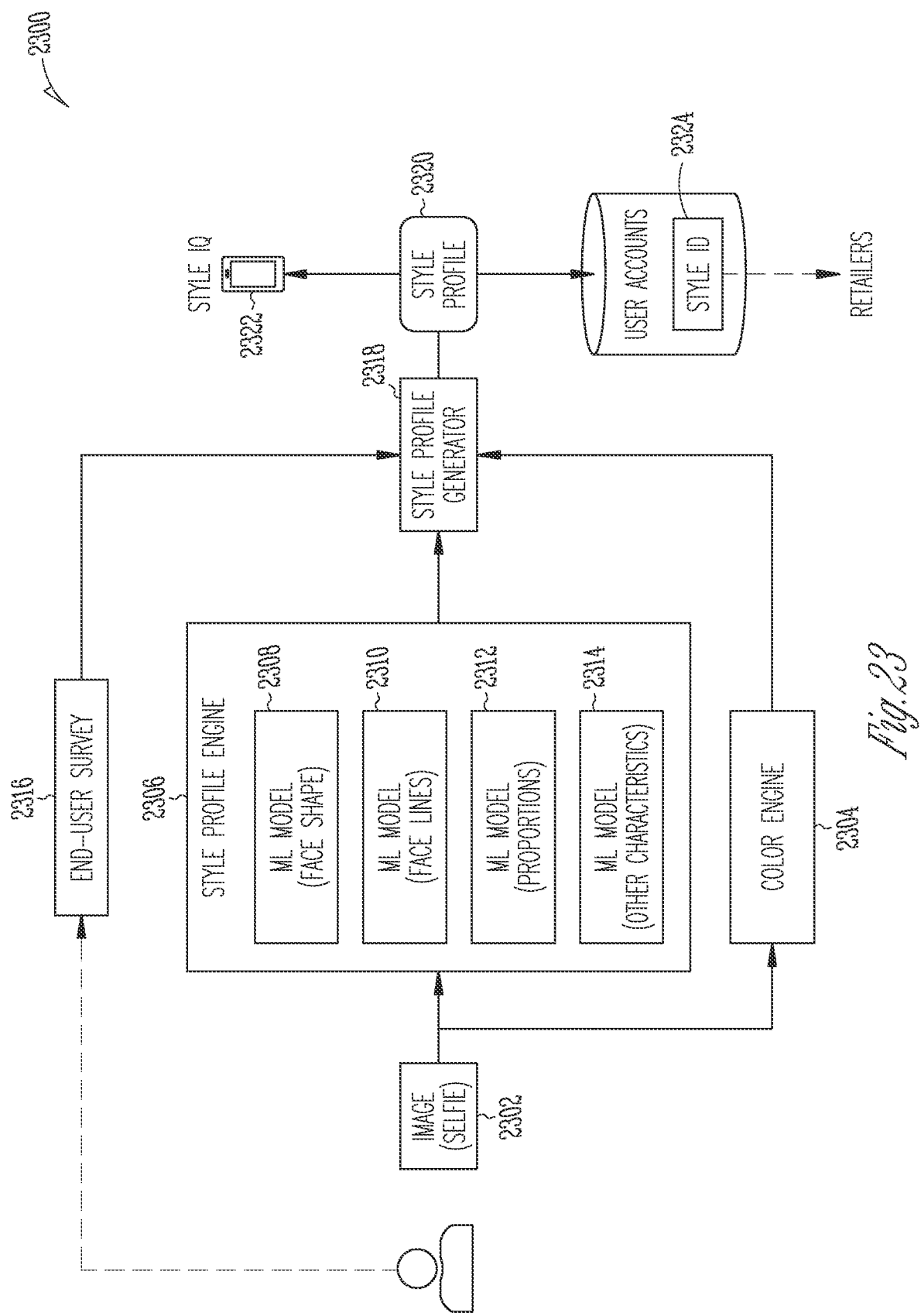
FIG. 23 illustrates an example of the operations performed as part of a method for generating a style profile for a user, based on analyzing a selfie, consistent with some embodiments.

FIG. 23 illustrates an example of a system that operates on inputs—for example, a selfie and (optionally) survey answers to generate a digital representation of a user's style profile, consistent with some embodiments. As shown in FIG. 23, a user obtains a selfie image 2302, and then provides the selfie image to both a color engine 2304 and a style profile engine 2306. The operations of the color engine 2304 have been described in detail above. With some embodiments, the style profile engine 2306 includes one or more machine learned models (e.g., 2308, 2310, 2312 and 2314), which are configured to receive the selfie image 2302 as input and generate the identification of one or more facial characteristics recognized or detected within the selfie 2304 as output. As further shown in FIG. 23, with some embodiments, each individual model may be trained to recognize or identify a different type of facial characteristic. For example, the model number 2308 has been trained to recognize or identify the shape of a face portrayed in the selfie image. The model 2310 has been trained to recognize or identify characteristics of facial lines present in the selfie image. Similarly, the model 2312 has been trained to identify metrics used to derive proportional measurements of different portions or features of a face portrayed in the selfie image. Finally, the model 2314 may be trained to identify some other facial characteristic.

Although shown in FIG. 23 as separate models, in some alternative embodiments, a single multi-layer model may be used, where, at each layer, different analysis is done to identify a different facial feature or characteristic. With this type of model, the output may be several different types of facial characteristics, and associated confidence score(s) indicating the likelihood of an individual facial characteristic being present in the selfie image 2302.

In addition to the color engine 2304 and the style profile engine 2306, the system can include an end-user survey component 2316. For example, with some embodiments, the user may be prompted to answer one or more survey questions. The answers provided by the user may be combined with the results output by the style profile engine 2306 and/or the color engine 2304 to generate one or more style profiles for the user as described below.

The outputs of the end-user survey component 2316, style profile engine 2306 and color engine 2304 are provided as input to a style profile generator 2318. With some embodiments, the style profile generator 2318 uses a rule-based approach to map various combinations of facial characteristics that have been detected to one of several predefined style profiles. For example, with some embodiments, a specific style profile may be associated with some combination of facial characteristics (and, optionally, survey answers). When the particular facial characteristics are determined to be present in the selfie image 2302, the user associated with the selfie is assigned to the specific style profile. In some instances, scores output by one or more models may be combined to generate an aggregate score. The aggregate score can be compared with a threshold score associated with one of several predefined style profiles and, when the aggregate score exceeds the threshold, the style profile is assigned to the user. In some instances, the style profile generator can compare each individual score associated with a characteristic with a threshold for that characteristic such that the specific characteristic is included in the aggregate score only when the score associated with the specific characteristic exceeds the threshold associated with the characteristic. The style profile generator 2318 may assign the user a single style profile 2320 or, in some instances, more than one style profile. With some embodiments, when more than one style profile is assigned to a user, the style generator 2318 may associate a confidence score with each style profile.

With some embodiments, the user-provided answers to survey questions in the end-user survey 2316 may be used in mapping or selecting a user style profile for the user. However, in other instances, the answers to survey questions may simply be stored as a separate component of a larger style ID for the user. Accordingly, with some embodiments, the survey question answers may be used in combination with the end-user's style profile 2320 to filter or select products. By way of example, if a particular product is selected because the product has product characteristics that map to a style profile 2320 of the user, the product may still be filtered out by virtue of an answer provided to a survey question. Furthermore, with some embodiments, the answers that are provided to survey questions may be used to weight or otherwise influence a ranking score that is assigned to a product that is being considered for a product recommendation to the user.

With some embodiments, the one or more style profiles 2320 may be stored in association with other information about the user as part of an end-user account or end-user profile, which may be referred to, for example, as a StyleID. With some embodiments, a style profile 2320 may be stored on a client computing device 2322 of the user such that the user has control over when and with whom the style profile is shared. Accordingly, a portable version of a style profile that can be shared with a retailer's system for purposes of selecting and recommending products to the user, the recommendations based on information present in the StyleID. In other instances, the style profile may be accessible to the end-user via a mobile application such that the user can reference the style profile or StyleID via the mobile application when the user is shopping for products. In some instances, the style profile may be stored in association with an account of a user and may be accessible to third-parties (e.g., retailers) when the user has provided authorization, and so forth.

The invention claimed is:

1. A computer-implemented method comprising:
    accessing a digital image depicting a face of a user;
    inputting the digital image to a first machine learned model;
    deriving, by the first machine learned model, output data indicating one or more facial characteristics of one or more facial features of the face depicted in the digital image, the one or more facial characteristics comprising at least a classification of the shape of the face, and a classification of one or more lines of the face;
    generating a digital representation of a style profile of the user from the one or more facial characteristics of the one or more facial features of the face;
    communicating the digital representation of the style profile of the user to an application executing at a client computing device, the application configured to store the style profile of the user in a memory of the client computing device; and
    in response to a user request for a product recommendation, selecting and presenting one or more product recommendations via a user interface of an application executing on the client computing device, wherein the one or more product recommendations are selected based on analysis of the digital representation of the style profile of the user.

2. The computer-implemented method of claim 1, wherein the output data comprises at least a metric representing a confidence score indicating a likelihood that the shape of the face depicted in the image is one of a predetermined number of shapes that the machine learning model has been trained to detect.

3. The computer-implemented method of claim 2, wherein the predetermined number of shapes that the machine learning model has been trained to detect comprises one or more of: rectangular, rounded rectangular, circular, ovaloid, inverted triangular, trapezoidal, kite, or any combination thereof.

4. The computer-implemented method of claim 1, wherein the machine learning model has been trained to output data comprising a metric representing a size of a line detected in the image of the face.

5. The computer-implemented method of claim 1, wherein the machine learning model has been trained to output data comprising a metric representing a distance between two facial features detected in the image of the face.

6. The computer-implemented method of claim 5, further comprising:
    generating a proportion of a facial feature from the one or more facial characteristics of the one or more facial features of the face.

7. The computer-implemented method of claim 1, wherein the output data comprises a metric representing a confidence score indicating a likelihood that a line detected in the face depicted in the image is one of a predetermined number of line types that the machine learning model has been trained to detect.

8. The computer-implemented method of claim 7, wherein the predetermined number of line types that the machine learning model has been trained to detect comprises one or more of: curved and straight.

9. The computer-implemented method of claim 1, wherein generating a digital representation of a style profile of the user from the one or more facial characteristics of the one or more facial features of the face comprises:
    assigning a style profile to the user that maps to a combination of facial characteristics identified in the image of the face of the user.

10. The computer-implemented method of claim 1, wherein generating a digital representation of a style profile of the user from the one or more facial characteristics of the one or more facial features of the face comprises:
    combining a score for each facial characteristic in a combination of facial characteristics associated with a style profile of a plurality of predefined style profiles to derive an aggregate score for the combination of facial characteristics;
    comparing the aggregate score for the combination of facial characteristics with a threshold score associated with the style profile; and
    assigning the style profile to the user when the aggregate score for the combination of facial characteristics exceeds the threshold score associated with the style profile.

11. The computer-implemented method of claim 1, further comprising
    prompting a user to provide answers to one or more survey questions via a user interface of an application executing at the client computing device; and
    generating the digital representation of the style profile of the user based upon answers provided by the user to the one or more survey questions.

12. The computer-implemented method of claim 1, further comprising:
    inputting the digital image to a second machine learned model; and
    deriving, by the second machine learned model, color output data relating to one or more colors identified in facial features of the face;
    matching a color in the one or more colors identified in facial features of the face to a color palette using a configured color look-up rule; and
    communicating the color palette to the mobile application executing at the client computing device;
    wherein the one or more product recommendations are selected based on the digital representation of the style of the user and the color palette.

13. A system comprising:
a processor for executing instructions; and
a memory storage device storing instructions, which, when executed by the processor, cause the system to perform operations comprising:
accessing a digital image depicting a face of a user;
inputting the digital image to a first machine learned model;
deriving, by the first machine learned model, output data indicating one or more facial characteristics of one or more facial features of the face depicted in the digital image, the one or more facial characteristics comprising at least a classification of the shape of the face, and a classification of one or more lines of the face;
generating a digital representation of a style profile of the user from the one or more facial characteristics of the one or more facial features of the face;
communicating the digital representation of the style profile of the user to an application executing at a client computing device, the application configured to store the style profile of the user in a memory of the client computing device; and
in response to a user request for a product recommendation, selecting and presenting one or more product recommendations via a user interface of an application executing on the client computing device, wherein the one or more product recommendations are selected based on analysis of the digital representation of the style profile of the user.

14. The system of claim 13, wherein the output data comprises at least a metric representing a confidence score indicating a likelihood that the shape of the face depicted in the image is one of a predetermined number of shapes that the machine learning model has been trained to detect.

15. The system of claim 14, wherein the predetermined number of shapes that the machine learning model has been trained to detect comprises one or more of: rectangular, rounded rectangular, circular, ovaloid, inverted triangular, trapezoidal, kite, or any combination thereof.

16. The system of claim 13, wherein the machine learning model has been trained to output data comprising a metric representing a size of a line detected in the image of the face.

17. The system of claim 13, wherein the machine learning model has been trained to output data comprising a metric representing a distance between two facial features detected in the image of the face.

18. The system of claim 17, wherein the operations further comprise:
generating a proportion of a facial feature from the one or more facial characteristics of the one or more facial features of the face.

19. The system of claim 13, wherein the output data comprises a metric representing a confidence score indicating a likelihood that a line detected in the face depicted in the image is one of a predetermined number of line types that the machine learning model has been trained to detect.

20. The system of claim 19, wherein the predetermined number of line types that the machine learning model has been trained to detect comprises one or more of: curved and straight.

21. The system of claim 13, wherein generating a digital representation of a style profile of the user from the one or more facial characteristics of the one or more facial features of the face comprises:
assigning a style profile to the user that maps to a combination of facial characteristics identified in the image of the face of the user.

22. The system of claim 13, wherein generating a digital representation of a style profile of the user from the one or more facial characteristics of the one or more facial features of the face comprises:
combining a score for each facial characteristic in a combination of facial characteristics associated with a style profile of a plurality of predefined style profiles to derive an aggregate score for the combination of facial characteristics;
comparing the aggregate score for the combination of facial characteristics with a threshold score associated with the style profile; and
assigning the style profile to the user when the aggregate score for the combination of facial characteristics exceeds the threshold score associated with the style profile.

23. The system of claim 13, further comprising:
prompting a user to provide answers to one or more survey questions via a user interface of an application executing at the client computing device; and
generating the digital representation of the style profile of the user based upon answers provided by the user to the one or more survey questions.

24. The system of claim 13, further comprising:
inputting the digital image to a second machine learned model; and
deriving, by the second machine learned model, color output data relating to one or more colors identified in facial features of the face;
matching a color in the one or more colors identified in facial features of the face to a color palette using a configured color look-up rule; and
communicating the color palette to the mobile application executing at the client computing device;
wherein the one or more product recommendations are selected based on the digital representation of the style of the user and the color palette.

* * * * *